United States Patent
Oh et al.

(10) Patent No.: US 11,991,304 B2
(45) Date of Patent: May 21, 2024

(54) METHOD FOR CONTROLLING EXTERNAL ELECTRONIC APPARATUS OF ELECTRONIC APPARATUS, ELECTRONIC APPARATUS, AND RECORDING MEDIUM

(71) Applicant: SAMSUNG ELECTRONICS CO., LTD., Gyeonggi-do (KR)

(72) Inventors: Younghak Oh, Gyeonggi-do (KR); Minji Lee, Gyeonggi-do (KR); Eunju Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 281 days.

(21) Appl. No.: 17/426,956

(22) PCT Filed: Jan. 29, 2020

(86) PCT No.: PCT/KR2020/001316
§ 371 (c)(1),
(2) Date: Jul. 29, 2021

(87) PCT Pub. No.: WO2020/159210
PCT Pub. Date: Aug. 6, 2020

(65) Prior Publication Data
US 2022/0103676 A1    Mar. 31, 2022

(30) Foreign Application Priority Data
Jan. 29, 2019 (KR) ........................ 10-2019-0011246

(51) Int. Cl.
*H04M 1/72415* (2021.01)
*G06F 3/01* (2006.01)
(Continued)

(52) U.S. Cl.
CPC ... *H04M 1/72415* (2021.01); *H04M 1/72427* (2021.01); *H04W 4/02* (2013.01)

(58) Field of Classification Search
CPC ........ G06F 3/012; G06F 3/0488; G06F 3/017; H04M 1/72415; H04M 1/72427
See application file for complete search history.

(56) References Cited

U.S. PATENT DOCUMENTS

2002/0138175 A1    9/2002  Fujita et al.
2006/0046848 A1    5/2006  Abe et al.
(Continued)

FOREIGN PATENT DOCUMENTS

KR    10-0842566    7/2008
KR    10-2012-0076137    7/2012
(Continued)

OTHER PUBLICATIONS

PCT/ISA/210 Search Report issued on PCT/KR2020/001316, dated May 11, 2020, pp. 5.
(Continued)

*Primary Examiner* — Sanghyuk Park
(74) *Attorney, Agent, or Firm* — The Farrell Law Firm, P.C.

(57) ABSTRACT

Disclosed is an electronic apparatus configured to receive, through a communication circuit, image data obtained using a camera of an external electronic device, and based on data related to a movement of the electronic device and obtained through the one or more sensors, perform control such that an image corresponding to the received image data is displayed on a touchscreen display while the image is maintained in a designated reference direction.

12 Claims, 24 Drawing Sheets

(51) Int. Cl.
  *H04M 1/72427* (2021.01)
  *H04W 4/02* (2018.01)

(56) References Cited

U.S. PATENT DOCUMENTS

| | | | |
|---|---|---|---|
| 2016/0191793 A1* | 6/2016 | Yang | H04N 23/635 |
| | | | 348/207.11 |
| 2016/0241767 A1* | 8/2016 | Cho | B64C 39/024 |
| 2016/0274582 A1 | 9/2016 | Banda et al. | |
| 2016/0344925 A1 | 11/2016 | Jeong | |
| 2017/0329324 A1 | 11/2017 | Bachrach et al. | |
| 2018/0024546 A1* | 1/2018 | Ha | B64C 39/024 |
| | | | 701/2 |
| 2018/0046179 A1 | 2/2018 | Choi | |
| 2018/0060556 A1* | 3/2018 | Fujino | H04W 12/06 |
| 2019/0197768 A1* | 6/2019 | Taylor | G02B 27/017 |
| 2020/0027277 A1* | 1/2020 | Woo | G06Q 30/0643 |
| 2021/0034222 A1* | 2/2021 | Brems | G06T 19/006 |

FOREIGN PATENT DOCUMENTS

| | | |
|---|---|---|
| KR | 101187420 | 10/2012 |
| KR | 10-2016-0134334 | 11/2016 |
| KR | 10-2016-0135476 | 11/2016 |
| KR | 10-2018-0017674 | 2/2018 |
| KR | 10-2020-0130985 | 11/2020 |

OTHER PUBLICATIONS

PCT/ISA/237 Written Opinion issued on PCT/KR2020/001316, dated May 11, 2020, pp. 4.

* cited by examiner

METHOD FOR CONTROLLING EXTERNAL ELECTRONIC APPARATUS OF ELECTRONIC APPARATUS, ELECTRONIC APPARATUS, AND RECORDING MEDIUM

PRIORITY

This application is a National Phase Entry of International Application No. PCT/KR2020/001316, which was filed on Jan. 29, 2020, and claims priority to Korean Patent Application No. 10-2019-0011246, which was filed on Jan. 29, 2019, the contents of each of which are incorporated herein by reference.

BACKGROUND

1. Field

The disclosure relates generally to an electronic device, and more particularly, to a method for controlling an external electronic device by the electronic device and a recording medium.

2. Description of Related Art

An electronic device may be connected to an external electronic device through communication so as to execute various functions. For example, an electronic device may be connected to an external electronic device through wireless communication, and the electronic device may control the external electronic device. The electronic device may receive an image captured through a camera from the external electronic device and may display the image on the screen of the electronic device such that the user can check the image received from the external electronic device and control the external electronic device through the electronic device.

While displaying an image received from an external electronic device on the screen, the electronic device may control the external electronic device based on the physical movement of the electronic device. The prior art is deficient in that the image received from the external electronic device and displayed on the screen is shaken by the physical movement of the electronic device. For example, when the external electronic device is controlled based on a quick movement of the electronic device, the image received from the external electronic device and displayed on the screen is quickly shaken, thereby causing problematic visual fatigue of the user.

Thus, there is a need in the art for a method and apparatus that compensates for such quick movement of the electronic device, thereby mitigating the shaking appearance of the image and visual fatigue of the user.

SUMMARY

The disclosure has been made to address at least the above-mentioned problems and/or disadvantages and to provide at least the advantages described below.

Accordingly, an aspect of the disclosure is to provide a method for controlling an external electronic device by an electronic device, an electronic device, and a recording medium, wherein the electronic device can control the external electronic device based on at least one of a touch input from a user or a physical movement of the electronic device.

Another aspect of the disclosure is to provide a method for controlling an external electronic device in which the physical movement of the electronic device may include one or both of the direction and the angle at Which the electronic device moves.

Another aspect of the disclosure is to provide a method for controlling an external electronic device, such that when the electronic device receives and displays an image from the external electronic device, the electronic device can display the image while maintaining a designated reference direction in spite of a physical movement of the electronic device.

Another aspect of the disclosure is to provide a method for controlling an external electronic device, in which the electronic device controls the external electronic device based on the physical movement of the electronic device such that, even if the electronic device is shaken, the electronic device can display the image received from the external electronic device while maintaining the designated reference direction.

According to an aspect of the disclosure, an electronic device may include a communication circuit, one or more sensors, a touchscreen display, one or more processors operatively connected to the communication circuit, the one or more sensors, and the touchscreen display, and a memory operatively connected to the one or more processors, wherein the memory stores instructions which, when executed, cause the one or more processors to receive, through the communication circuit, image data obtained using a camera of an external electronic device, and based on data related to a movement of the electronic device and obtained through the one or more sensors, perform control such that an image corresponding to the received image data is displayed on the touchscreen display while the image is maintained in a designated reference direction.

According to another aspect of the disclosure, a method for controlling an external electronic device by an electronic device may include receiving image data obtained using a camera of the external electronic device, identifying data related to a movement of the electronic device, the data being is obtained through one or more sensors of the electronic device, and based on the data related to the movement of the electronic device, displaying an image corresponding to the received image data on a touchscreen display of the electronic device while maintaining the image in a designated reference direction.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

Figure 1:
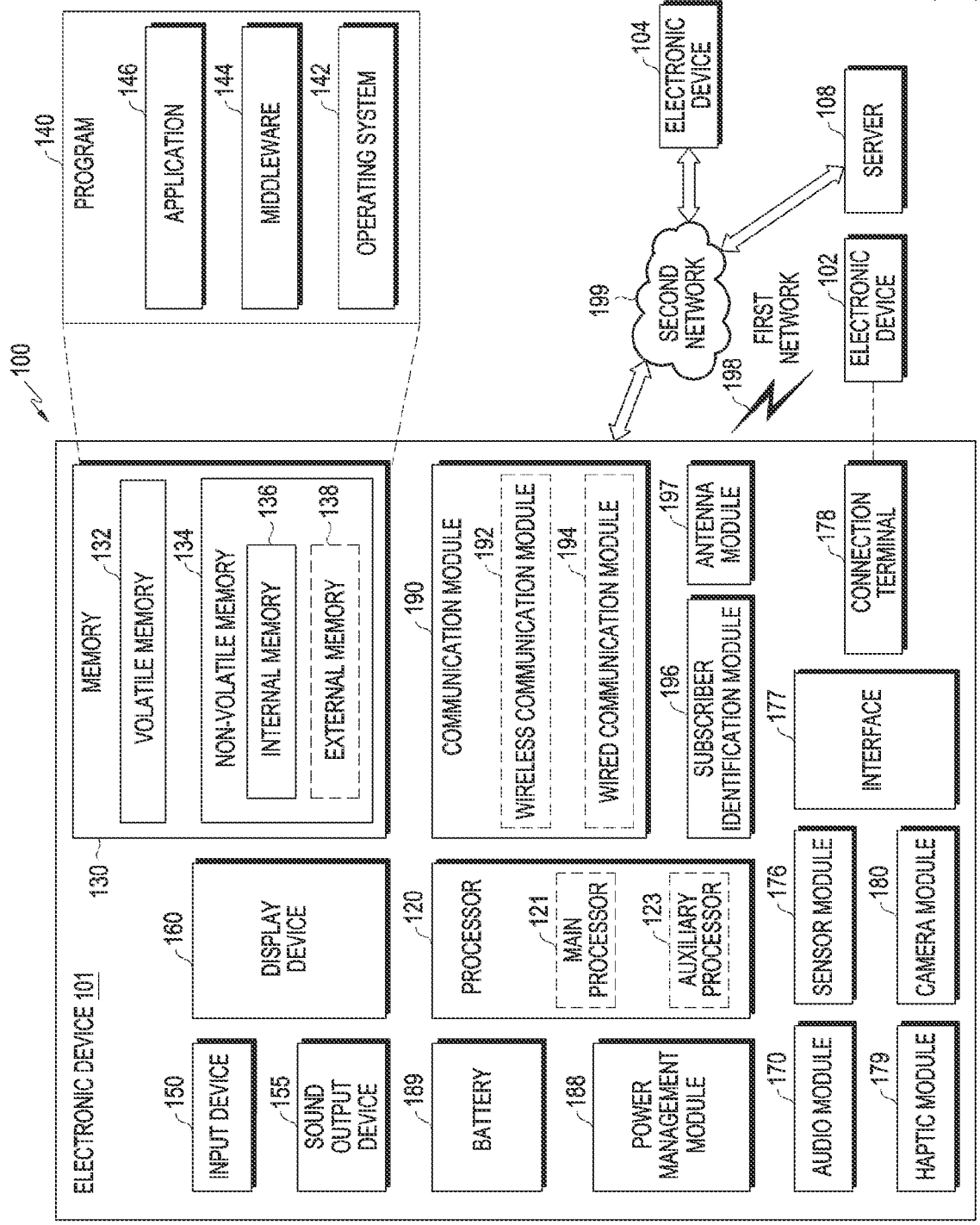
FIG. 1 is a block diagram of an electronic device in a network environment according to an embodiment.

Hereinafter, embodiments of the disclosure will be described in detail with reference to the accompanying drawings. In the disclosure, embodiments are described in the drawings and a related detailed description is set forth, but this is not intended to limit the embodiments of the disclosure, Descriptions of well-known functions and constructions are omitted for the sake of clarity and conciseness.

FIG. 1 is a block diagram illustrating an electronic device 101 in a network environment 100 according to an embodiment. Referring to FIG. 1 the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software e.g., a program 140) to control al least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101, The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (DASD) stored in the subscriber identification module 196.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end a cloud computing, distributed computing, or client-server computing technology may be used, for example.

Figure 2:
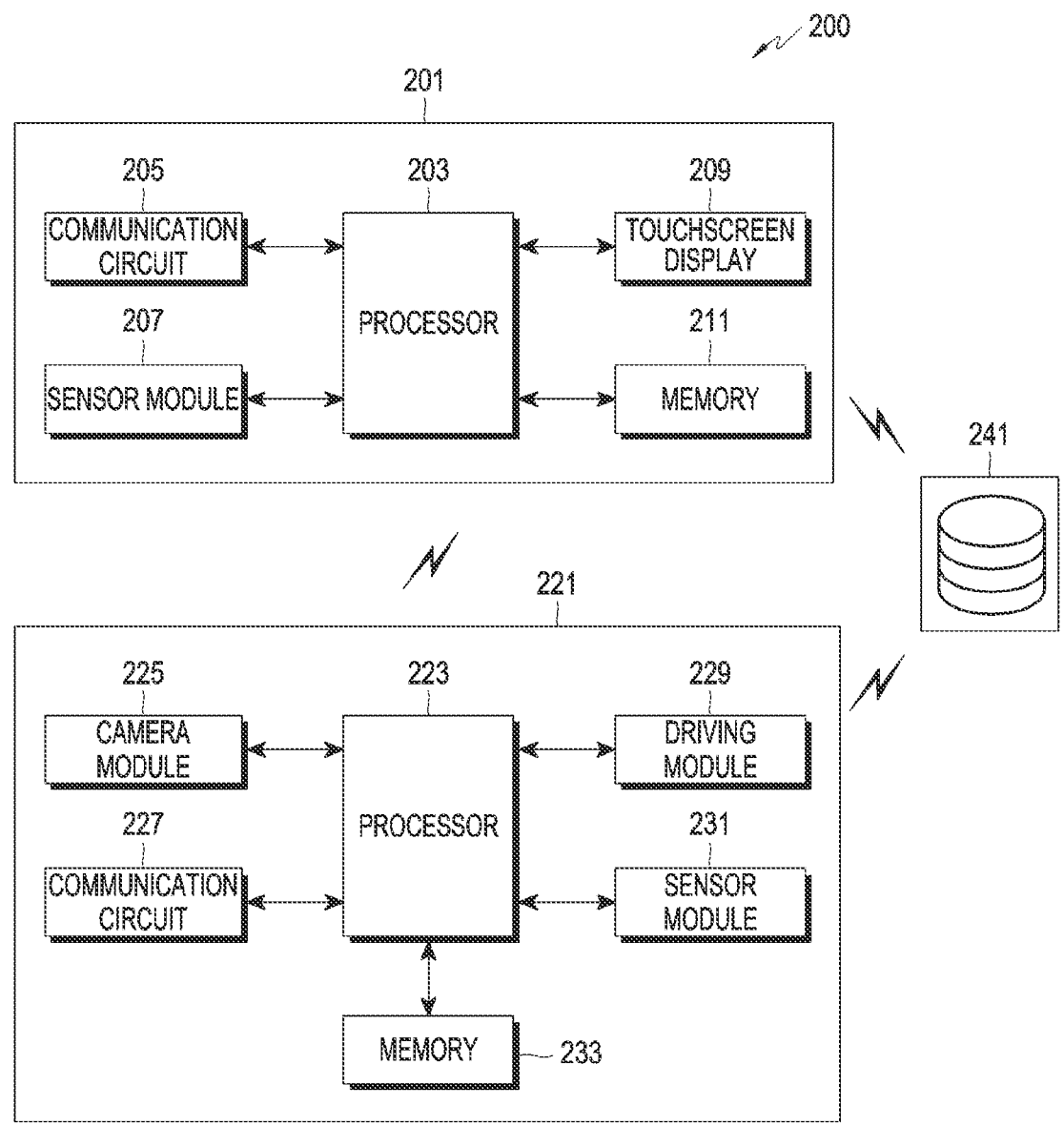
FIG. 2 illustrates a system fir controlling an external electronic device according to an embodiment.

FIG. 2 illustrates a system 200 for controlling an external electronic device according to an embodiment.

Referring to FIG. 2, the system 200 may include an electronic device 201 and an external electronic device 221, the electronic device controlling the external electronic device, and the external electronic device including a camera module 255 for capturing an image. The system 200 may further include a server 241.

The electronic device 201 may include at least a part of the elements of the electronic device 101 in FIG. 1, such as at least one of a processor 203 (e.g., the processor 120), a communication circuit 205 (e.g., the communication module 190), a sensor module 207 (e.g., the sensor module 176), a touchscreen display 209 (e.g., the display device 160), or a memory 211 (e.g., the memory 130).

The communication circuit 205 may establish a direct (e.g., wired) communication channel or a wireless communication channel to the external electronic device 221 and/or the server 241, and may support communication via the established communication channel.

The sensor module 207 may include at least one of a gyro sensor, an acceleration sensor, or a compass device. The gyro sensor may measure the angular velocity of the electronic device 201. The acceleration sensor may measure the acceleration of the electronic device 201. The compass device may measure the orientation of the electronic device 201.

The touchscreen display 209 may visually provide information to the outside (e.g., a user) of the electronic device 201, and may receive a touch, gesture, proximity, or hovering input using an electronic pen or a part of a user's body.

The processor 203 may execute calculation or data processing with respect to control and/or communication of at least one element of the electronic device 201.

The external electronic device 221 may include at least a part of the elements of the electronic device 101 in FIG. 1, such as at least one of a processor 223 (e.g., the processor 120), the camera module 225 (the camera module 180), a communication circuit 227 (the communication module 190), a driving module 229, a sensor module 231 (the sensor module 176), or a memory 233 (the memory 130).

The camera module 225 may obtain an image. For example, the camera module 225 may include a 360-degree camera capable of obtaining 360-degree image data. For example, the 360-degree camera may include multiple cameras for capturing a 360-degree multi-view image (an omnidirectional image).

The communication circuit 227 may establish a direct (e.g., wired) communication channel or a wireless communication channel to the electronic device 201 and/or the server 241, and may support communication via the established communication channel.

The driving module 229 may include one or more motors capable of moving at least a part of mechanical elements of the external electronic device 221 according to a control of the processor 223. The driving module 229 may be used to enable movement of the external electronic device 221 and move a mechanical element so as to mechanically change the external electronic device 221. The driving module 229 may have a shape enabling upward and downward, or leftward and rightward movements around at least one axis, and the shape may be variously implemented. For example, in the driving module 229, the one or more motors may be rotated according to a control of the processor 223, and accordingly, a movement of the external electronic device 221 may be generated, and/or the mechanical elements of the external electronic device 221 may be moved.

The sensor module 231 may sense an operation state (e.g., power or temperature) of the external electronic device 221 or an external environment state (e.g., a user's state), and generate an electrical signal or a data value corresponding to the sensed state.

The processor 223 may execute calculation or data processing with respect to control and/or communication of at least one element of the external electronic device 221.

For example, the external electronic device 221 may be implemented in a type of a robot, one or more motors may be included in each of mechanical elements, for example, a main body, one or more arm parts, and/or one or more moving parts (e.g., a leg part having various types, such as two feet or four feet, and/or one or more wheel parts), and the one or more motors included in each of the mechanical elements may be controlled by the processor 223, so as to control a movement of each of the elements.

For example, the external electronic device 221 may be implemented in a type (e.g., a drone) of an unmanned aerial vehicle. The external electronic device 221 may further include one or more propellers that may be operated by a control of the processor 223 and/or the driving module 229.

The server 241 may be the server 108 in FIG. 1.

The server 241 may be a server which manages Internet of Things (IoT) devices.

According to an embodiment, an electronic device (e.g., the electronic device 101 and/or the electronic device 201) may include a communication circuit, (e.g., a communication circuit (the communication module 190 and/or the communication circuit 205)); one or more sensors, (e.g., the sensor module 176 and/or the sensor module 207); a touchscreen display, (e.g., the display device 160 and/or the touchscreen display 209); one or more processors (e.g., the processor 120 and/or the processor 203) operatively connected to the communication circuit, the one or more sensors, and the touchscreen display, and a memory (e.g., the memory 130 and/or the memory 223) operatively connected to the one or more processors. The memory may store instructions which, when executed, cause the one or more processors to: receive, through the communication circuit, image data obtained using a camera (e.g., the camera module 225) of an external electronic device (e.g., the electronic device 102, the electronic device 104, and/or the external electronic device 221), and based on data related to a movement of the electronic device, obtained through the one or more sensors, perform control such that an image corresponding to the received image data is displayed on the touchscreen display while the image is maintained in a designated reference direction.

The instructions may cause the one or more processors to, based on the data related to the movement of the electronic device, transmit a control signal for controlling the external electronic device, through the communication circuit to the external electronic device or a server (e.g., the server 108 and/or the server 241) configured to communicate with the external electronic device.

The instructions may cause the one or more processors to, based on the data related to the movement of the electronic device, identify at least one of a traveling distance of the electronic device or a traveling direction of the electronic device, and based on at least one of the traveling distance of the electronic device or the traveling direction of the electronic device, transmit the control signal for controlling the external electronic device, through the communication circuit to the external electronic device or the server configured to communicate with the external electronic device.

The instructions may cause the one or more processors to, through the communication circuit, receive additional image data obtained using the camera of the external electronic device, and perform control such that an image corresponding to the received additional image data is displayed on the touchscreen display while the image is maintained in the designated reference direction.

The instructions may cause the one or more processors to, based on the data related to the movement of the electronic device, identify a rotation angle of the electronic device, and based on the rotation angle of the electronic device, display an image corresponding to the received image data on the touchscreen display in the designated reference direction.

The one or more sensors may include at least one of a gyro sensor, an acceleration sensor, or a compass device.

The instructions may cause the one or more processors to, based on a touch input received through the touchscreen display, transmit a control signal for controlling the external electronic device, through the communication circuit to the external electronic device or a server configured to communicate with the external electronic device.

The instructions may cause to, based on the received touch input while the image is being displayed on the touchscreen display, transmit the control signal, through the communication circuit to the external electronic device or the server configured to communicate with the external electronic device.

The instructions may cause the one or more processors to receive the image data through the communication circuit from the external electronic device or a server configured to communicate with the external electronic device.

Figure 3:
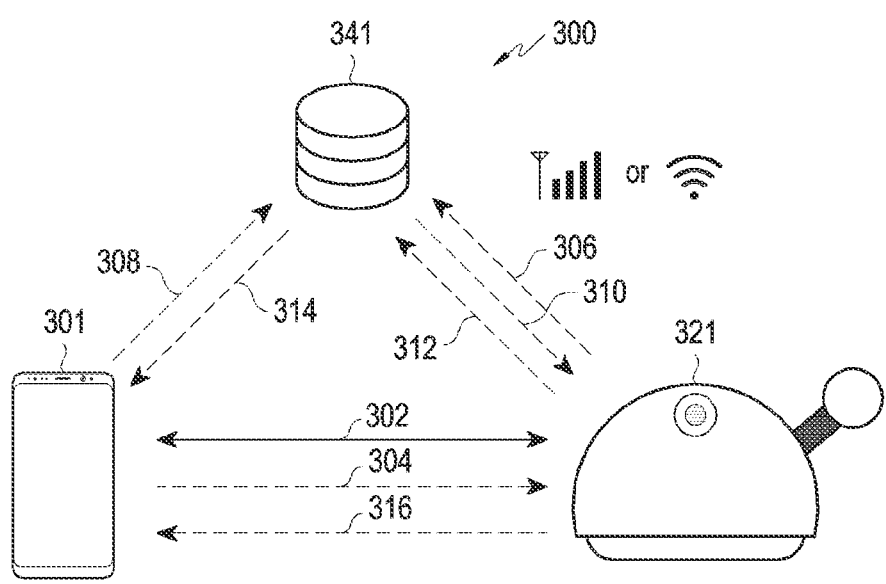
FIG. 3 illustrates an operation for controlling, by an electronic device, an external electronic device according to an embodiment.

FIG. 3 is a diagram 300 illustrating an operation for controlling, by an electronic device 301 (e.g., the electronic device 201), an external electronic device 321 (e.g., the external electronic device 221) according to an embodiment.

In an operation 302, the electronic device 301 may be connected to the external electronic device 321 through wired or wireless communication.

The electronic device 301 and the external electronic device 321 may communicate with each other through a first network (e.g., the first network 198) (e.g., a short-range communication network such as Bluetooth™, WiFi direct, or IrDA).

The external electronic device 321 may transmit a communication signal for establishing communication with the electronic device 301 by using a communication circuit (e.g., the communication circuit 227) to the electronic device 301 so as to establish communication with the electronic device 301. For example, the external electronic device 321 may transmit the communication signal to the electronic device 301, based on a user input (e.g., a button, a touch, or a voice input) or automatically when the external electronic device 321 is initially executed.

Alternatively, the electronic device 301 may transmit a communication signal for establishing communication with the external electronic device 321 by using a communication circuit (e.g., the communication circuit 205) to the external electronic device 321 so as to establish communication with the external electronic device 321. For example, the electronic device 301 may execute an application for controlling the external electronic device 321, based on a user input, and may transmit the communication signal to the external electronic device 321, based on a user input for executing a function of the application to establish communication with the external electronic device 321, or automatically when the application is executed.

In an operation 304, the electronic device 301 may transmit information related to a server 341 to the external electronic device 321.

The electronic device 301 may transmit the information related to the server 341 to the external electronic device 321 by using a communication circuit (e.g., the communication circuit 205). For example, the information related to the server 341 may include at least one of an IP address of the server 341, a password, or user account information.

In an operation 306, the external electronic device 321 may communicate with the server 341, based on the information related to the server 341, so as to register the external electronic device 321 in the server 341.

The external electronic device 321 may communicate with the server 341 through the first network or a second network (the second network 199) a long-range communication network such as a cellular network, the Internet, or a computer network (e.g., LAN or WAN)).

The external electronic device 321 may identify the server 341 to be subject to registration, by using the information related to the server 341, and may establish communication with the server 341 by using the communication circuit. The external electronic device 321 may transmit registration request information to the communication-established server 341, based on the information related to the server 341.

The external electronic device 321 may be registered in the server 341, based on an authentication operation of the server 341 having received the registration request information.

In an operation 308, the electronic device 301 may transmit a control signal for controlling the external electronic device 321 to the server 341.

The electronic device 301 may communicate with the server 341 through the first network or the second network.

The electronic device 301 may transmit a control signal for controlling the external electronic device 321 to the server 341 by using the communication circuit. For example, the control signal may be a signal generated based on at least one of data which is related to a movement of the electronic device 301 and is obtained through one or more sensors (e.g., the sensor module 207) of the electronic device, a touch input received through a touchscreen display (e.g., the touchscreen display 209) of the electronic device 301, a voice input received through a microphone of the electronic device 301, or a button input received through a button of the electronic device 301.

In an operation 310, the server 341 may transmit a control signal received from the electronic device 301, to the external electronic device 321.

The server 341 may transmit a control signal for controlling the external electronic device 321 to the external electronic device 321 by using a communication circuit.

In an operation 312, the external electronic device 321 may transmit image data to the server 341 by using the communication circuit, and in an operation 314, the server 341 may transmit the image data to the electronic device 301 by using the communication circuit. Alternatively, in an operation 316, the external electronic device 321 may directly transmit the image data to the electronic device 301 through the first network (e.g., a short-range communication network) without transmitting through the server 341.

In FIG. 3, the electronic device 301 transmits a control signal for controlling the external electronic device 321 to the external electronic device 321 through the server 341. However, the electronic device 301 may directly transmit a control signal for controlling the external electronic device 321 to the external electronic device 321 through the first network (e.g., a short-range communication network) without transmitting through the server 341.

Figure 4A:
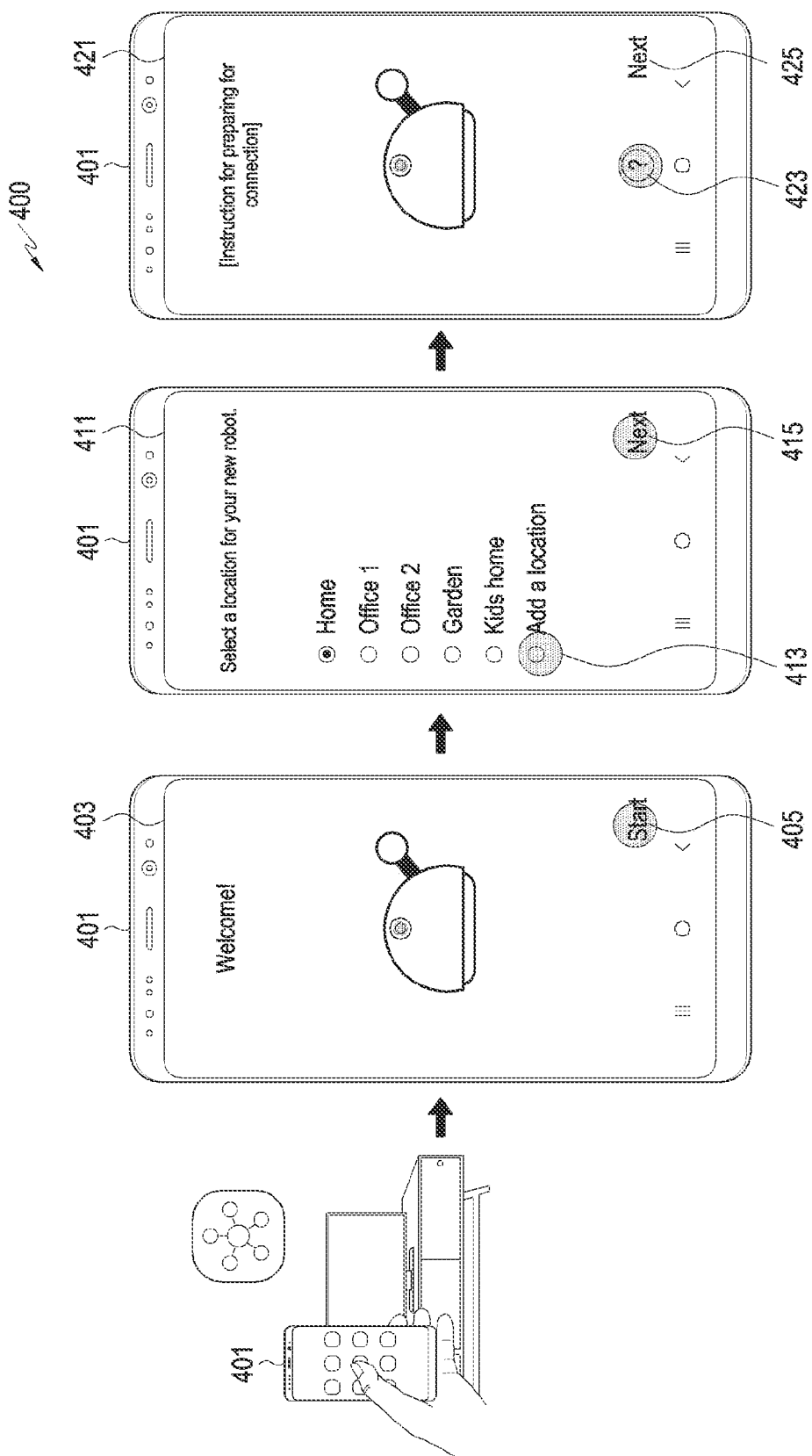
FIG. 4A and FIG. 4B illustrate an operation for registering an external electronic device in a server through an electronic device according to an embodiment.
Figure 4B:
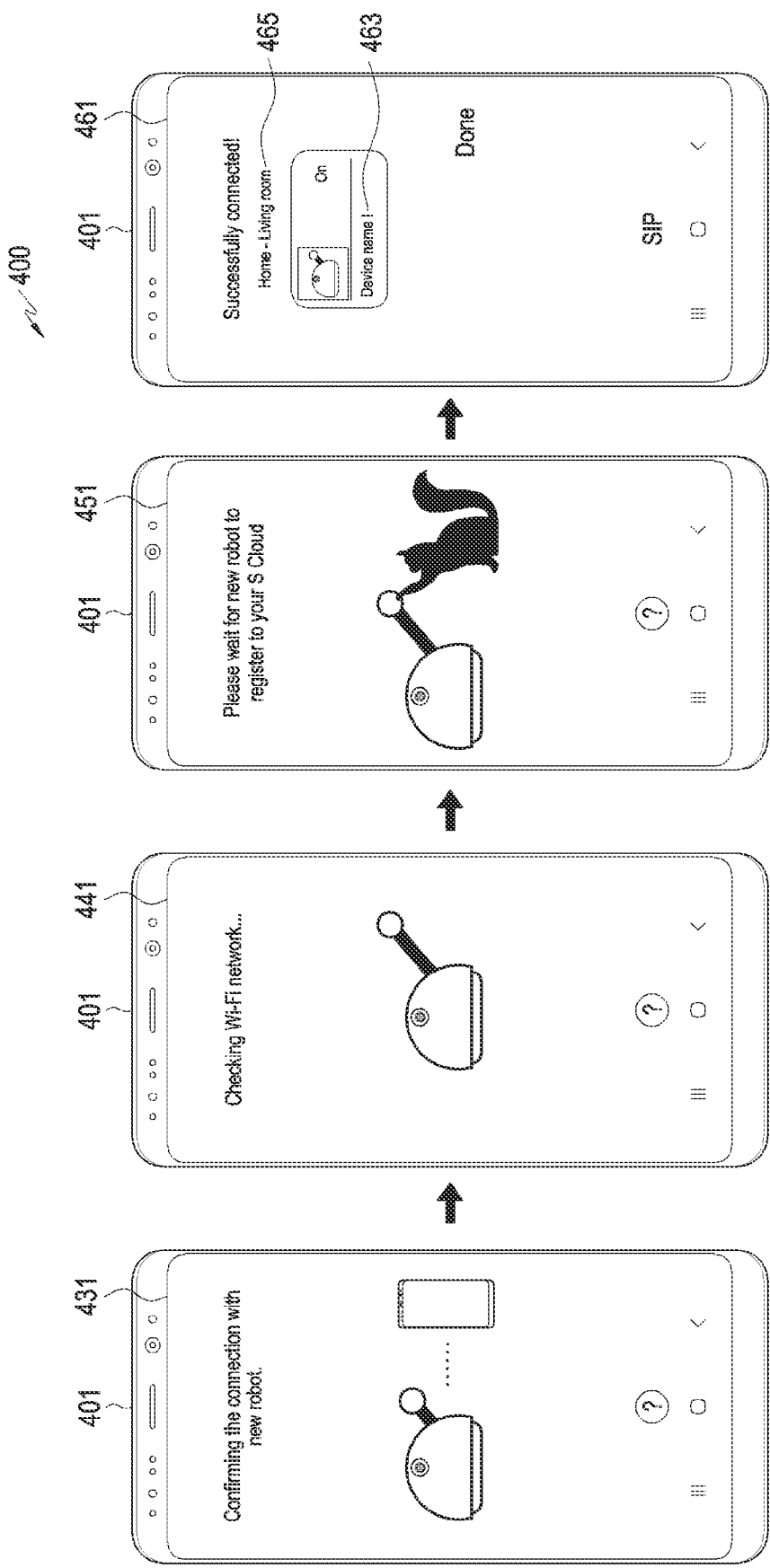

FIG. 4A and FIG. 4B are diagrams 400 illustrating an operation for registering an external electronic device (e.g., the external electronic device 221) in a server (e.g., the server 241) through an electronic device 401 (e.g., the electronic device 201) according to an embodiment.

The electronic device 401 may execute an application for controlling an external electronic device, based on a user input, and the electronic device 401 may display a first screen 403 of the application on a touchscreen display (e.g., the touchscreen display 209) according to the execution of the application. For example, the first screen may include a predesignated basic execution screen of the application.

When a user input (a touch input) on a button 405 (e.g., a start button) of the first screen 403 is received, the electronic device 401 may display a second screen 411 on the touchscreen display. For example, the second screen 411 may include a screen allowing configuration of the location of the external electronic device. For example, the second screen 411 may enable selection of one location item among multiple location items. For example, the multiple location items may include Home, Office 1, Office 2, Garden, Kids home, and/or Add a location. For example, Add location may be an item configured to allow a user to directly type in a location item.

When one location item 413 is selected based on a user input among the multiple location items, the electronic device 401 may store location information of the external electronic device, corresponding to the selected location item 413.

When a user input (a touch input) on a button 415 (e.g., a next button) of the second screen 411 is received, the electronic device 401 may display a third screen 421 on the touchscreen display. For example, the third screen may include a screen allowing execution of an operation for allowing registration of the external electronic device in the server. For example, the third screen 421 may include a first button 423 and a second button 425. When a user input (a touch input) on the first button 423 of the third screen 421 is received, the electronic device 401 may display a screen including help information of the application on the touchscreen display automatically or by a user's control. The screen including the help information of the application may provide an application function introduction and/or a method for controlling a registered external electronic device by using the application.

When a user input (a touch input) on the second button 425 of the third screen 421 is received, the electronic device 401 may execute an operation for allowing registration of the external electronic device in the server.

For example, the electronic device 401 may establish communication with the external electronic device, and may transmit, to the external electronic device, information related to the server, for establishing communication between the external electronic device and the server, and registering the external electronic device in the server.

The external electronic device may perform an operation for registration in the server, based on the execution of the operation for allowing registration of the external electronic device in the server. For example, the external electronic device may establish communication to the server, based on the information related to the server, and may be registered in the server, based on an authentication operation of the server.

While the operation of the electronic device 401, for allowing registration of the external electronic device in the server, and the operation of the external electronic device, for registration in the server, are being performed, the electronic device 401 may sequentially display one or more wait screens on the touchscreen display. For example, as shown in FIG. 4B, the one or more wait screens may include at least one of a fourth screen 431, a fifth screen 441, or a sixth screen 451. The fourth screen 431 may include information indicating that communication establishment between the electronic device 401 and the external electronic device is being confirmed. The fifth screen 441 may include information indicative that the external electronic device executes a network checking operation for communication with the server. The sixth screen 461 may include information indicating that the external electronic device is executing an operation for registration in the server.

When the registration of the external electronic device in the server is complete, the electronic device 401 may display a seventh screen 461 on the touchscreen display.

The seventh screen 461 may include information indicating that the external electronic device has been registered in the server. The seventh screen 461 may include an item 463 allowing a user to type a name of the external electronic device. The seventh screen 461 may include location information 465 of the external electronic device.

Figure 5:
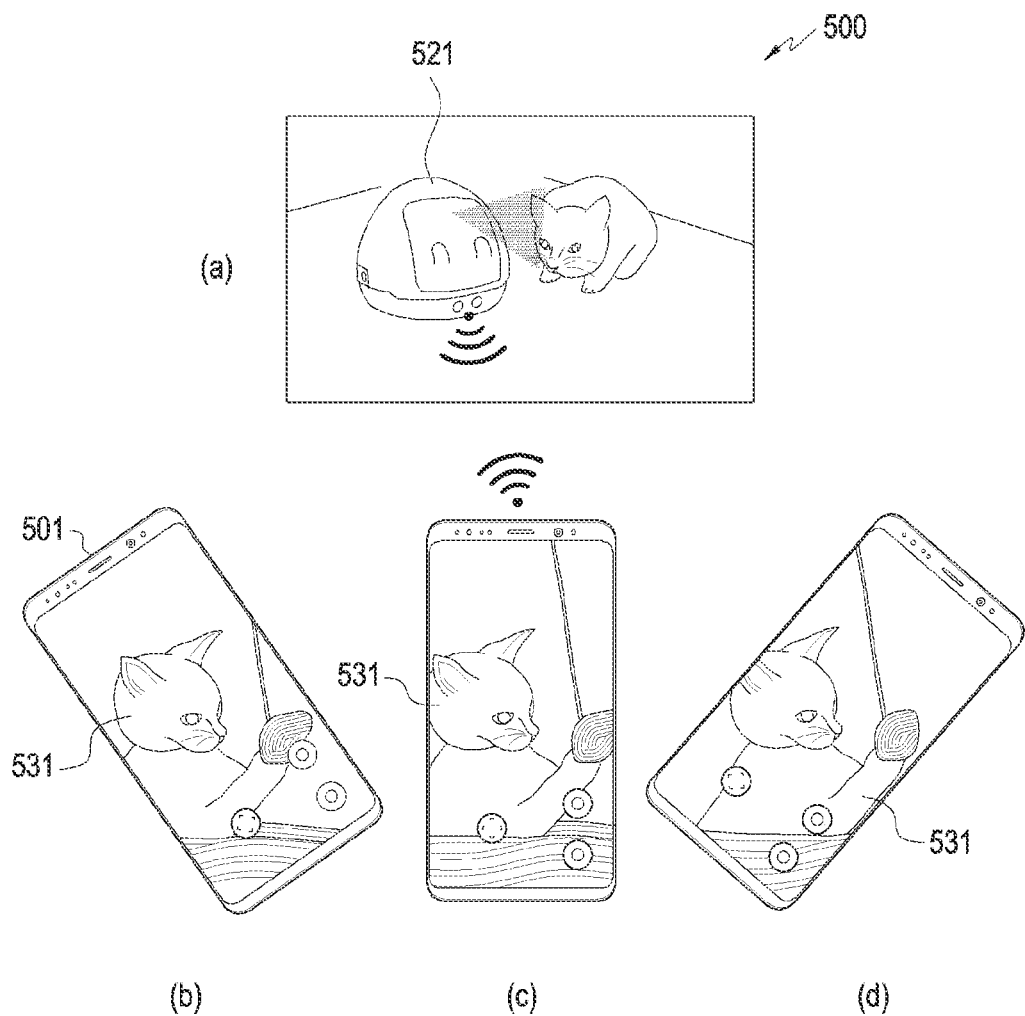
FIG. 5 illustrates an operation for controlling, by an electronic device, an external electronic device according to an embodiment.

FIG. 5 is a diagram 500 illustrating an operation for controlling, by an electronic device. 501 (e.g., the electronic device 101, the processor 120 of the electronic device 101, the electronic device 201, and/or the processor 203 of the electronic device 201), an external electronic device 521 (e.g., the electronic device 102, the electronic device 104, and/or the electronic device 221) according to an embodiment.

Referring to FIG. 5, the electronic device 501 may control the external electronic device 521 connected thereto through communication (remotely connected thereto). For example, the electronic device 501 and the external electronic device 521 may be connected to each other through communication. The electronic device 501 may remotely drive the external electronic device 521 by using a physical movement of the electronic device 501. The physical movement may include at least one of travel of the electronic device 501 or rotation of the electronic device 501. The travel of the electronic device 501 may include a change in the location of the electronic device 501 in a particular direction, such as an upward, downward, leftward, or rightward direction, and may be determined based on at least one of a traveling distance of the electronic device 501 or a traveling direction of the electronic device 501 under the assumption that the current location of the electronic device 501 is 0.

The rotation of the electronic device 501 may be determined based on a rotation angle (an inclination) of the electronic device 501. A change in the rotation angle of the electronic device 501 may be determined by calculating an angle in a direction in which the electronic device 501 inclines under the assumption that the current posture (or orientation) of the electronic device 501 is 0 degrees. The electronic device 501 may transmit a control signal for allowing the external electronic device 521 to physically move corresponding to a physical movement of the electronic device 501, to the external electronic device 521. For example, when the electronic device 501 moves in an upward, downward, leftward, or rightward direction, the electronic device may transmit a control signal for allowing the external electronic device 521 to move in an upward, downward, leftward, or rightward direction, to the external electronic device 521.

Referring to view (a) in FIG. 5, the external electronic device 521 may obtain image data by using a camera, and transmit the image data to the electronic device 501. The image data may be streaming data. The external electronic device 521 may capture an image by using the camera and stream the image in real time.

When the electronic device 501 displays an image 531 corresponding to image data received from the external electronic device 521, the displaying of the image may not be affected by a movement of the electronic device 501 as shown in views (b), (c) and (d) in FIG. 5. The electronic device 501 may fix and display the image 531 corresponding to the image data obtained from the camera of the external electronic device 521, in a designated direction (e.g., the gravity direction) regardless of the posture of the electronic device 501. For example, even when the electronic device 501 is moved, the electronic device 501 may fix and display the image 531 in a designated direction.

Referring to view (b) in FIG. 5, while the electronic device 501 is inclined at a first angle (e.g., 315 degrees), when image data is received from the external electronic device 521, the electronic device. 501 may display the image 531 corresponding to the image data in a designated reference direction without displaying the image at the first angle according to the movement of the electronic device 501.

Referring to view (c) in FIG. 5, while the electronic device 501 is inclined at a second angle (e.g., 0 degrees), when image data is received from the external electronic device 521, the electronic device 501 may display the image 531 corresponding to the image data in the designated reference direction.

Referring to view (d) in FIG. 5, while the electronic device 501 is inclined at a third angle (e.g., 45 degrees), when image data is received from the external electronic device 521, the electronic device 501 may display the image 531 corresponding to the image data in the designated reference direction without displaying the image at the third angle according to the movement of the electronic device 501.

The electronic device 501 may also transmit a control signal for allowing the external electronic device 521 to perform specific functions corresponding to a user input (a touch input or a voice input) through the user input to the electronic device 501, rather than a physical operation of the external electronic device 521, which is caused by a physical movement of the electronic device 501.

Figure 6:
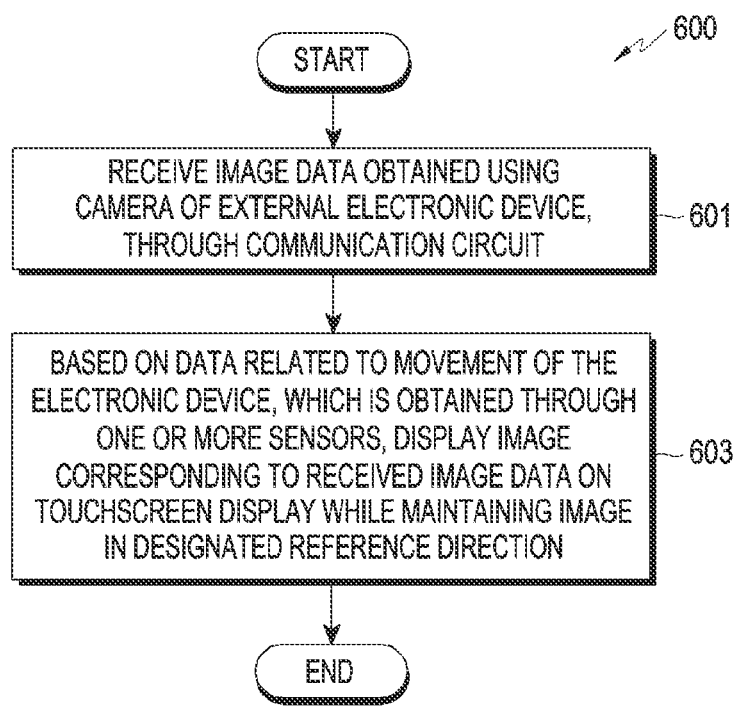
FIG. 6 illustrates an operation for controlling, by an electronic device, an external electronic device according to an embodiment.

FIG. 6 is a flowchart 600 of an operation for controlling, by an electronic device (e.g., the electronic device 101, the processor 120 of the electronic device 101, the electronic device 201, and/or the processor 203 of the electronic device 201), an external electronic device (e.g., the electronic device 102, the electronic device 104, and/or the electronic device 221) according to an embodiment.

In an operation 601, an electronic device may receive image data obtained using a camera of an external electronic device, through a communication circuit (e.g., the communication circuit 205) of the electronic device.

The electronic device may receive the image data from the external electronic device or a server which communicates with the external electronic device.

In relation to the image data, the external electronic device may transmit an image obtained using a camera of the external electronic device to the electronic device or a server which communicates with the electronic device, by using a streaming scheme, and the electronic device may receive the image data, which is streaming data, from the external electronic device or the server.

In an operation 603, based on data related to a movement of the electronic device, which is obtained through one or more sensors (e.g., the sensor module 207) of the electronic device, the electronic device may display an image corresponding to the received image data on a touchscreen display (e.g., the touchscreen display 209) of the electronic device while maintaining the image in a designated reference direction.

The designated reference direction may be a predesignated direction allowing an image corresponding to the received image data to always be fixed and displayed in a constant direction, regardless of a change in the rotation angle (inclination) of the electronic device.

The electronic device may display an image corresponding to initial image data in the designated reference direction, based on at least one of the current location or the posture (or orientation) of the electronic device at a time of reception of the image data.

Figure 7:
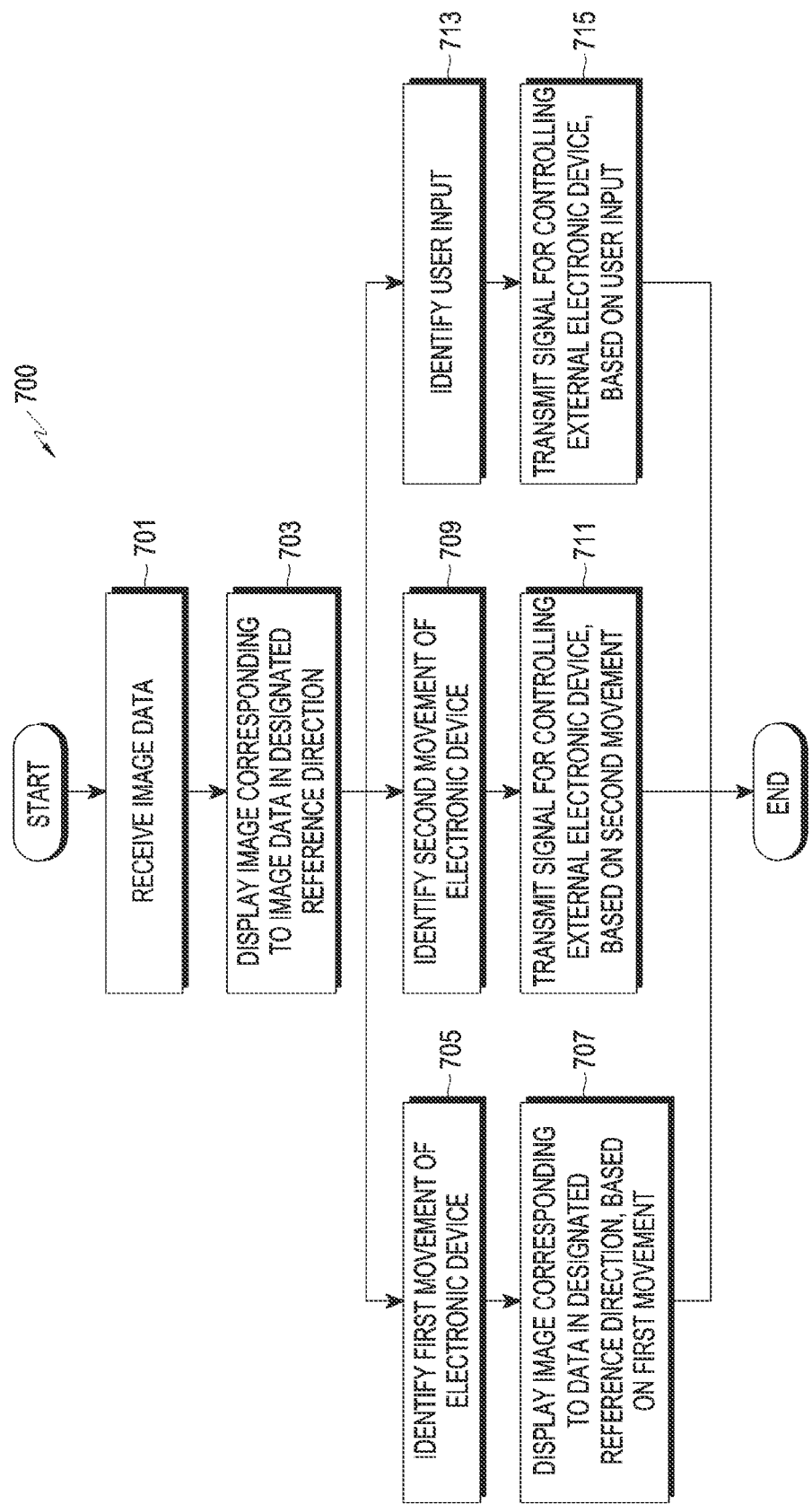
FIG. 7 illustrates an operation for controlling, by an electronic device, an external electronic device according to an embodiment.

FIG. 7 is a flowchart 700 of an operation for controlling, by an electronic device (e.g., the electronic device 101, the processor 120 of the electronic device 101, the electronic device 201, and/or the processor 203 of the electronic device 201), an external electronic device (e.g., the electronic device 102, the electronic device 104, and/or the electronic device 221) according to an embodiment.

In an operation 701, the electronic device may receive image data obtained using a camera of the external electronic device from the external electronic device by using a wireless communication circuit (e.g., the wireless communication circuit 205). The external electronic device may transmit an image obtained using the camera to the electronic device by using a streaming scheme, and accordingly, the electronic device may receive the image data, which is streaming data.

Alternatively, the electronic device may receive image data obtained through the camera of the external electronic device, from a server by using the wireless communication circuit. The external electronic device may transmit an image obtained using the camera to the server by using a streaming scheme, and accordingly, the server may receive the image data, which is streaming data, and transmit the received image data to the electronic device.

In operation 703, the electronic device may display an image corresponding to the image data in a designated reference direction on a touchscreen display (e.g., the touchscreen display 209) of the electronic device.

The designated reference direction may be a predesignated direction allowing an image corresponding to the received image data to always be fixed and displayed in a constant direction, regardless of a change in the rotation angle (inclination) of the electronic device.

The electronic device may display a first image corresponding to first image data in the designated reference direction, based on at least one of the current location or the posture (or orientation) of the electronic device at a time of reception of the image data.

In an operation 705, the electronic device may identify a first movement of the electronic device.

The electronic device may identify the first movement of the electronic device by using one or more sensors. The first movement of the electronic device may include rotation (change in inclination) of the electronic device. The electronic device may identify a rotation angle of the electronic device, which is caused by the rotation of the electronic device.

In an operation 707, the electronic device may display the image corresponding to the image data in the designated reference direction on the touchscreen display of the electronic device, based on the first movement of the electronic device.

When the first movement of the electronic device includes rotation (change in inclination) of the electronic device, the electronic device may display the image corresponding to the image data in the designated reference direction, based on the rotation angle of the electronic device, which is caused by the rotation of the electronic device. The electronic device may display the image rotated corresponding to the rotation angle of the electronic device. For example, if the rotation angle of the electronic device is 45 degrees, the electronic device may display the image rotated by 45 degrees in the direction opposite to the rotation direction of the electronic device so as to display the image to be maintained in the designated reference direction.

In an operation 709, the electronic device may identify a second movement of the electronic device.

The electronic device may identify the second movement of the electronic device by using one or more sensors. The second movement of the electronic device may include travel of the electronic device. The electronic device may identify at least one of a traveling distance of the electronic device or a traveling direction of the electronic device, which is caused by the travel of the electronic device.

In an operation 711, the electronic device may transmit a signal for controlling the external electronic device, based on the second movement of the electronic device.

The signal based on the second movement may be for controlling a function of the external electronic device. The signal based on the second movement may be for controlling a physical movement of the external electronic device (and/or an element of the external electronic device). The signal may be for controlling the external electronic device to move in an upward, downward, leftward, and/or rightward direction corresponding to an upward, downward, leftward, and/or rightward movement of the electronic device, respectively.

The signal based on the second movement may include at least one piece of information among the traveling distance of the electronic device or the traveling direction of the electronic device, and/or a command to control the external electronic device. For example, a command to control the external electronic device corresponding to the second movement of the electronic device may be predesignated and stored in at least one of the electronic device, the external electronic device, or the server.

The electronic device may transmit the signal based on the second movement to the external electronic device by using the wireless communication circuit.

Alternatively, the electronic device may transmit the signal based on the second movement to the server by using the wireless communication circuit. The server having received the signal based on the second movement may transmit the signal based on the second movement to the external electronic device by using a wireless communication circuit.

In an operation 713, the electronic device may identify a user input.

The user input may include at least one of a touch input on the touchscreen display of the electronic device, an input through a button of the electronic device, or a voice input through a microphone of the electronic device.

In an operation 715, the electronic device may transmit a signal for controlling the external electronic device, based on the user input.

The signal based on the user input may be for controlling a function of the external electronic device. The signal based on the user input may include at least one of a signal for controlling a physical movement of the external electronic device (and/or an element of the external electronic device) or a signal for controlling a software function of the external electronic device.

The electronic device may transmit the signal to the external electronic device by using the wireless communication circuit.

Alternatively, the electronic device may transmit the signal to the server by using the wireless communication circuit. The server having received the signal may transmit the signal to the external electronic device by using the wireless communication circuit.

FIGS. 8A, 8B, 8C, and 8D illustrate an operation for controlling, by an electronic device 801 (e.g., the electronic device 101, the processor 120 of the electronic device 101, the electronic device 201, and/or the processor 203 of the electronic device 201), an external electronic device 821 (e.g., the electronic device 102, the electronic device 104, and/or the electronic device 221) according to an embodiment.

The external electronic device 821 may be a type of robot including a driving module (e.g., the driving module 229).

Figure 8A:
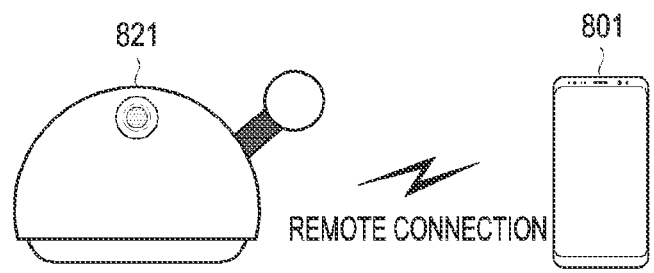
FIGS. 8A, 8B, 8C, and 8D illustrate an operation for controlling, by an electronic device, an external electronic device according to an embodiment.

The electronic device 801 may communicate with (be remotely connected to) the external electronic device 821 as illustrated in FIG. 8A.

Figure 8B:
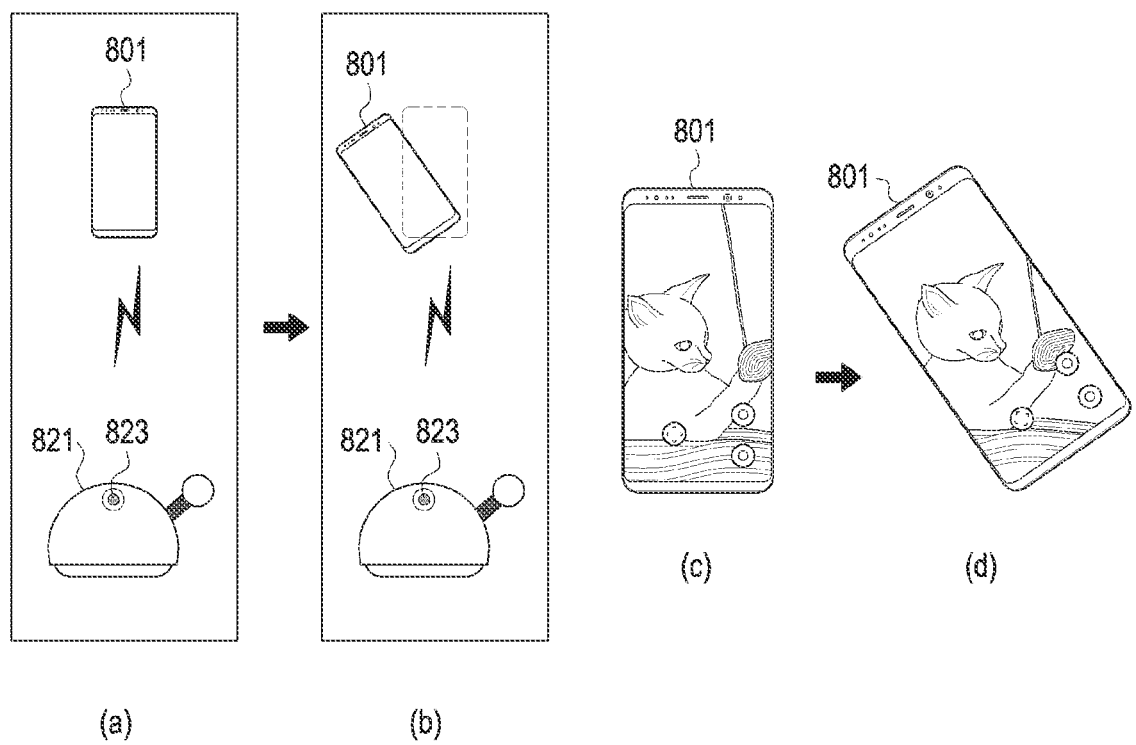

The electronic device 801 may display an image corresponding to image data received by the electronic device 801 such that the image is always fixed in a constant direction regardless of a change in the inclination of the electronic device 801, as illustrated in FIG. 8B.

For example, as shown in view (a) in FIG. 8B, the electronic device 801 remotely connected to the external electronic device 821 may receive image data obtained through a camera 823 of the external electronic device 821, from the external electronic device 821. The electronic device 801 having received the image data may display an image corresponding to the image data in a designated reference direction, based on the posture (or orientation) of the electronic device 801 at a time of reception of the image data, as shown in view (c) of FIG. 8B.

For example, as shown in view (c) in FIG. 8B, when the electronic device 801 remotely connected to the external electronic device 821 is moved by a first rotation angle (e.g., the first rotation angle=315 degrees) shown in view (d), the electronic device 801 may display the image to be continuously maintained in the designated reference direction, based on the first rotation angle, as shown in view (d) in FIG. 8B. The electronic device 801 may allow the image to be rotated and displayed so as to correspond to the first rotation angle of the electronic device 801. For example, when the rotation angle of the electronic device is 315 degrees, the electronic device 801 may rotate the image in the direction opposite to the rotation direction of the electronic device to display the image rotated by 315 degrees, so that the image is displayed to be maintained in the designated reference direction.

Figure 8C:
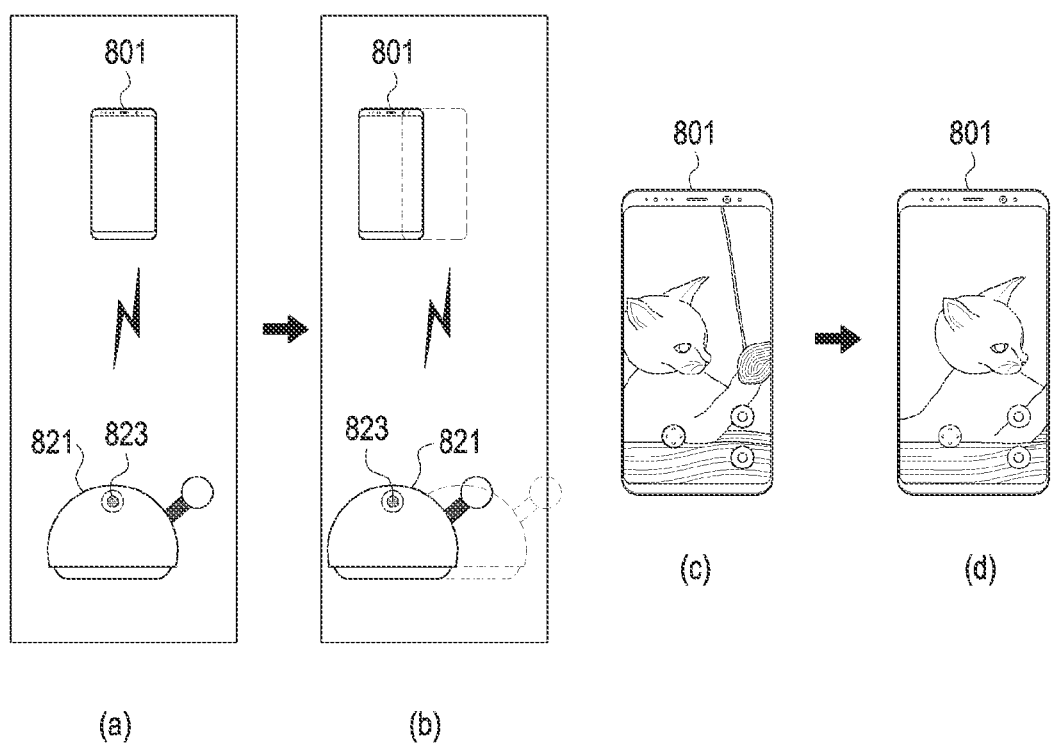

The electronic device 801 may control the external electronic device 821, based on travel of the electronic device 801, as shown in FIG. 8C. The external electronic device 821 may receive a control signal, based on travel of the electronic device 801, and may physically move based on the control signal.

For example, as shown in view (a) in FIG. 8C, the electronic device 801 remotely connected to the external electronic device 821 may receive first image data obtained through the camera 823 of the external electronic device 821, from the external electronic device 821. The electronic device 801 having received the first image data may display a first image corresponding to the first image data in a designated reference direction, based on the posture (or orientation) of the electronic device 801 at a time of reception of the first image data, as shown in view (c) of FIG. 8C.

In view (c), when the electronic device 801 remotely connected to the external electronic device 821 is moved to a first location, the electronic device 801 may identify at least one piece of information among a traveling distance (e.g., the traveling distance=1 cm) caused by the travel of the electronic device 801 or a traveling direction (e.g., the traveling direction=right direction) of the electronic device 801, and may transmit a signal for controlling the external electronic device 821 to the external electronic device 821, based on the identified information. The signal for controlling the external electronic device 821 may include at least one of the traveling distance of the electronic device 801 or the traveling direction of the electronic device 801. The signal for controlling the external electronic device 821 may include a command to control the external electronic device 821, corresponding to at least one of the traveling distance of the electronic device 801 or the traveling direction of the electronic device 801.

For example, controlling the external electronic device 821 may include controlling a physical movement of the external electronic device 821, and the external electronic device 821 having received the signal may control a physical movement of the external electronic device 821, based on the signal. For example, as shown in view (b) in FIG. 8C, the external electronic device 821 may move based on the traveling distance of the electronic device 801 and the traveling direction of the electronic device 801 moved by the user.

The traveling external electronic device 821 may obtain second image data by using the camera 823, and may transmit the obtained second image data to the electronic device 801. The electronic device 801 having received the second image data may display a second image corresponding to the second image data in a designated reference direction, as shown in view (d) in FIG. 8C.

Figure 8D:
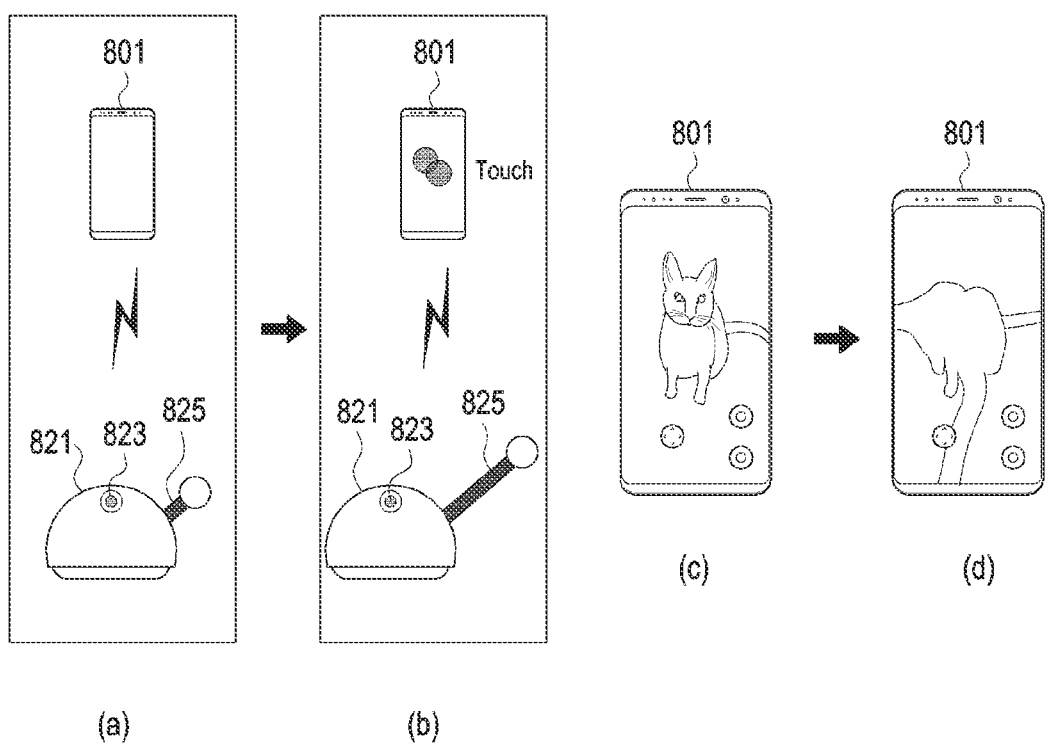

The electronic device 801 may control the external electronic device 821, based on a user input (e.g., a touch input and/or a voice input), as shown in FIG. 8D.

In view (a) in FIG. 8D, the electronic device 801 remotely connected to the external electronic device 821 may receive first image data obtained through the camera 823 of the external electronic device 821, from the external electronic device 821. The electronic device 801 having received the first image data may display a first image corresponding to the first image data in a designated reference direction, as shown in view (c) in FIG. 8D.

For example, while the electronic device 801 is displaying the first image as shown in view (c) in FIG. 8D, the electronic device may receive a touch input, as shown in view (b) FIG. 8D, and may transmit a signal for controlling the external electronic device 823, to the external electronic device 823, based on the touch input.

The external electronic device 821 having received the signal may execute a designated function corresponding to the signal. For example, if the signal is a signal for physically controlling a first element 825 of the electronic device, the electronic device 801 may control (control the length of the first element 825 to be extended or reduced, and/or control the first element 825 to move) the first element 825, as shown in view (b) FIG. 8D.

The external electronic device 821 executing the designated function may obtain second image data by using the camera 823, and may transmit the obtained second image data to the electronic device 801. The electronic device 801 having received the second image data may display a second image corresponding to the second image data in a designated reference direction, as shown in view (d) in FIG. 8D.

Further to the embodiment of FIG. 8B, the electronic device 801 may transmit a control signal corresponding to the rotation angle of the electronic device 801 to the external electronic device 821, so as to execute a second function of the external electronic device 821. The second function may include a function of changing the rotation angle of the external electronic device 821 to correspond to the rotation angle of the electronic device 801. For example, if the electronic device 801 is rotated by 315 degrees, the electronic device 801 may transmit a signal for controlling the external electronic device 821 to be rotated by 135 degrees, to the external electronic device 821 so that the external electronic device 821 may execute a rotation operation. For example, if there is no physical element (a rotation shaft) for allowing the external electronic device 821 to perform a rotation operation according to a control signal of the electronic device 801, the external electronic device 821 may ignore the control signal.

In the embodiment of FIGS. 8A-8D, rotation, location movement, or a touch input of the electronic device 801 are individually executed. However, Alternatively, at least two operations among rotation, location movement, or a touch input of the electronic device 801 may be simultaneously executed, so that the operations in the embodiments for controlling the electronic device 801 and/or the external electronic device 821 may be executed simultaneously.

According to the embodiment of FIGS. 8A-8D, the electronic device 801 and the external electronic device 821 are operated while communicating with each other. Alternatively, the electronic device 801 and the external electronic device 821 may be operated while communicating with each other through a server (e.g., the server 108 and/or the server 241). The external electronic device 821 may transmit image data obtained through capturing by the external electronic device 821 to the electronic device 801 through the server. The electronic device 801 may transmit a signal for controlling the external electronic device 821 to the external electronic device 821 through the server, FIG. 9 is a diagram 900 illustrating an operation for processing, by an external electronic device 921 (e.g., the electronic device 102, the electronic device 104, and/or the electronic device 221), image data 931 obtained using a camera 923, according to an embodiment (e.g., the camera module 180 and/or the camera module 225).

Figure 9:
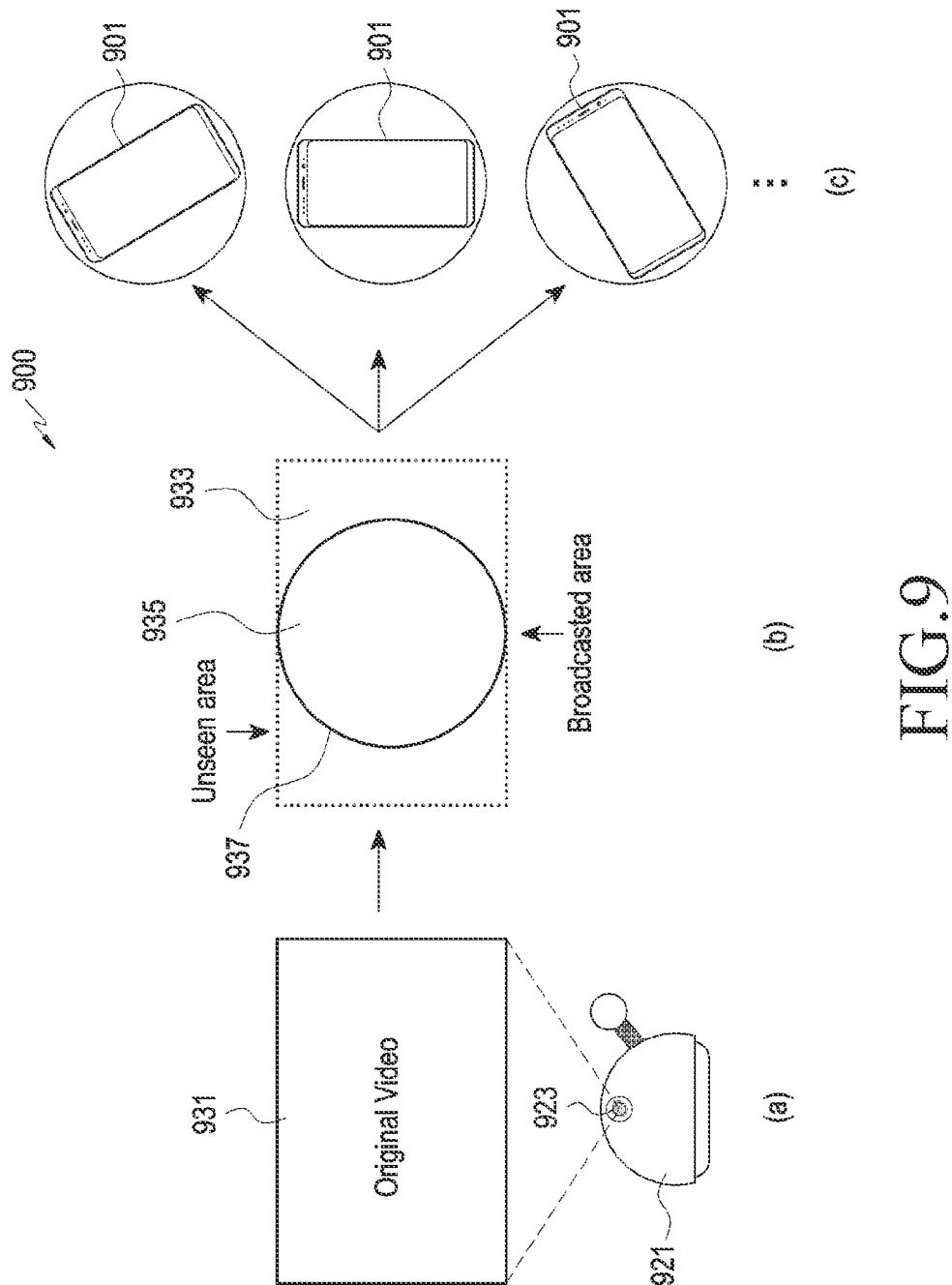
FIG. 9 illustrates an operation for processing, by an external electronic device, image data obtained using a camera.

Referring to stage (a) in FIG. 9, the external electronic device 921 may obtain image data (original video) 931 by using the camera 923.

Referring to stage (b) in FIG. 9, the external electronic device 921 may determine image data to be transmitted to an electronic device 901, which corresponds to a designated shape in the image data 931. The external electronic device 921 may divide the image data 931 into a first area 933 (e.g., non-displayed area (unscreen area)) and a second area 935 (broadcast area). For example, under an assumption that a sphere 937 having a designated size is formed around a central point of the image data 931 or a central point of an area of interest of the image data 931, the external electronic device 921 may determine an outside area of the sphere 937 as the first area 933, and determine an inside area 935 of the sphere as the second area. The size of the sphere 937 may be designated based on the size of a touchscreen display of the electronic device 901 and/or a designated image size which is displayed on the touchscreen display of the electronic device 901. The electronic device 901 may trim image data corresponding to the first area 933 off the image data 931.

The external electronic device 921 may transmit image data corresponding to the second area 935 to the electronic device 901.

Referring to stage (c) in FIG. 9, the electronic device 901 having received the image data corresponding to the second area 935 may display an image corresponding to image data received by the electronic device 901 such that the image is always fixed in a constant direction regardless of a change in the inclination of the electronic device, as in the embodiment described above with reference to FIG. 8B. In order to display an image corresponding to the received image data, to be maintained in a designated reference direction, the image may be rotated and displayed to correspond to the rotation angle of the electronic device 901, based on the designated reference direction.

In FIG. 9, an operation of determining image data corresponding to a designated shape in the image data 931 obtained by the external electronic device 923 is executed. Alternatively, the electronic device 901 may receive the image data 931 obtained by the external electronic device 923 and execute an operation of determining image data corresponding to a designated shape to be displayed, similarly to the operation of the external electronic device 923.

FIGS. 10A, 10B, 10C, and 10D illustrate an operation for controlling, by an electronic device 1001 (e.g., the electronic device 101, the processor 120 of the electronic device 101, the electronic device 201, and/or the processor 203 of the electronic device 201), an external electronic device 1021 (e.g., the electronic device 102, the electronic device 104, and/or the electronic device 221) according to an embodiment.

The external electronic device 1021 may be an unmanned aerial vehicle including a driving module 229.

Figure 10A:
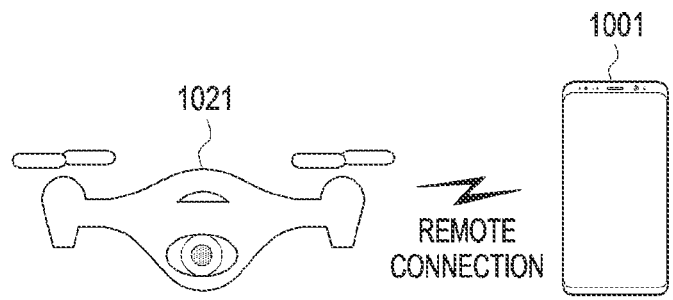
FIGS. 10A, 10B, 10C, and 10D illustrate an operation for controlling, by an electronic device, an external electronic device according to an embodiment.

The electronic device 1001 may communicate with (be remotely connected to) the external electronic device 1021 as illustrated in FIG. 10A.

Figure 10B:
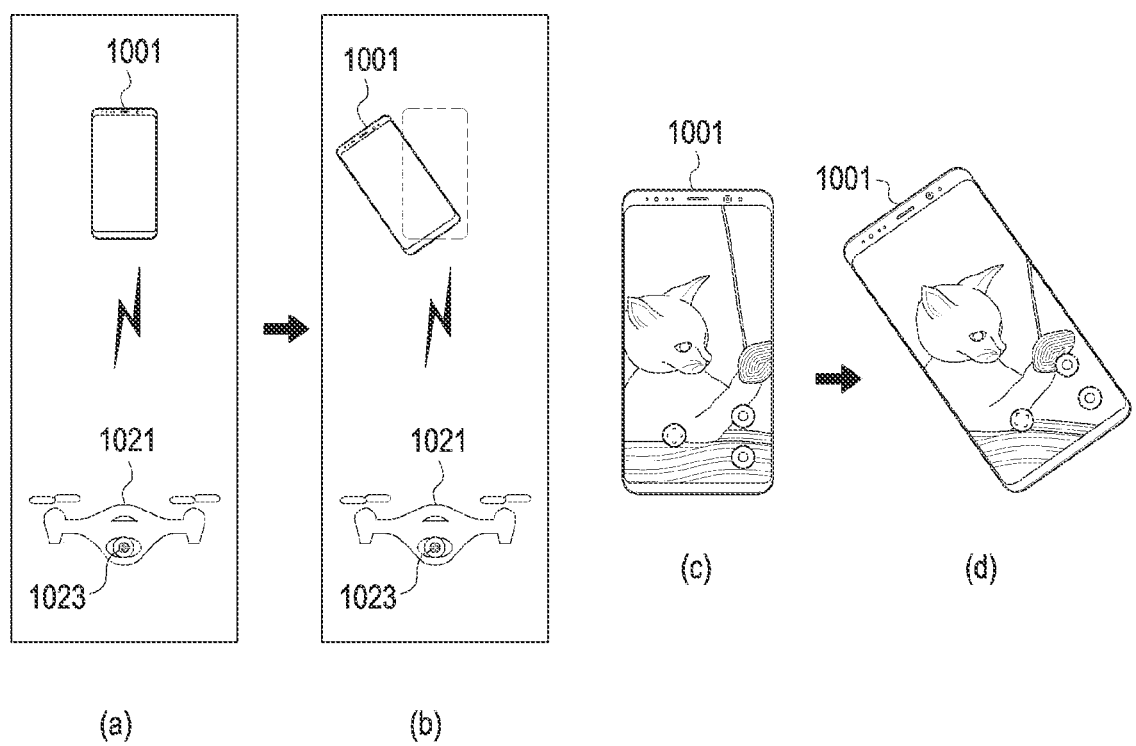

The electronic device 1001 may display an image corresponding to image data received by the electronic device 1001 such that the image is always fixed in a constant direction regardless of a change in the inclination of the electronic device 1001, as illustrated in FIG. 10B.

For example, as shown in view (a) in FIG. 10B, the electronic device 1001 remotely connected to the external electronic device 1021 may receive image data obtained through a camera 1023 of the external electronic device 1021, from the external electronic device 1021. The electronic device 1001 having received the image data may display an image corresponding to the image data in a designated reference direction, based on the posture (or orientation) of the electronic device 1001 at a time of reception of the image data, as shown in view (c) of FIG. 10B.

For example, as shown in view (c) in FIG. 10B, when the electronic device 1001 remotely connected to the external electronic device 1021 is moved by a first rotation angle (e.g., the first rotation angle=315 degrees), the electronic device 1001 may display the image to be continuously maintained in the designated reference direction without displaying the image at the first rotation angle according to the movement of the electronic device 1001, as shown in view (d) in FIG. 10B. The electronic device 1001 may allow the image to be rotated and displayed so as to correspond to the first rotation angle of the electronic device 1001. For example, when the rotation angle of the electronic device 1001 is 315 degrees, the electronic device 1001 may rotate and display the image in the direction opposite to the rotation direction of the electronic device by 315 degrees, so that the image is displayed to be maintained in the designated reference direction.

Figure 10C:
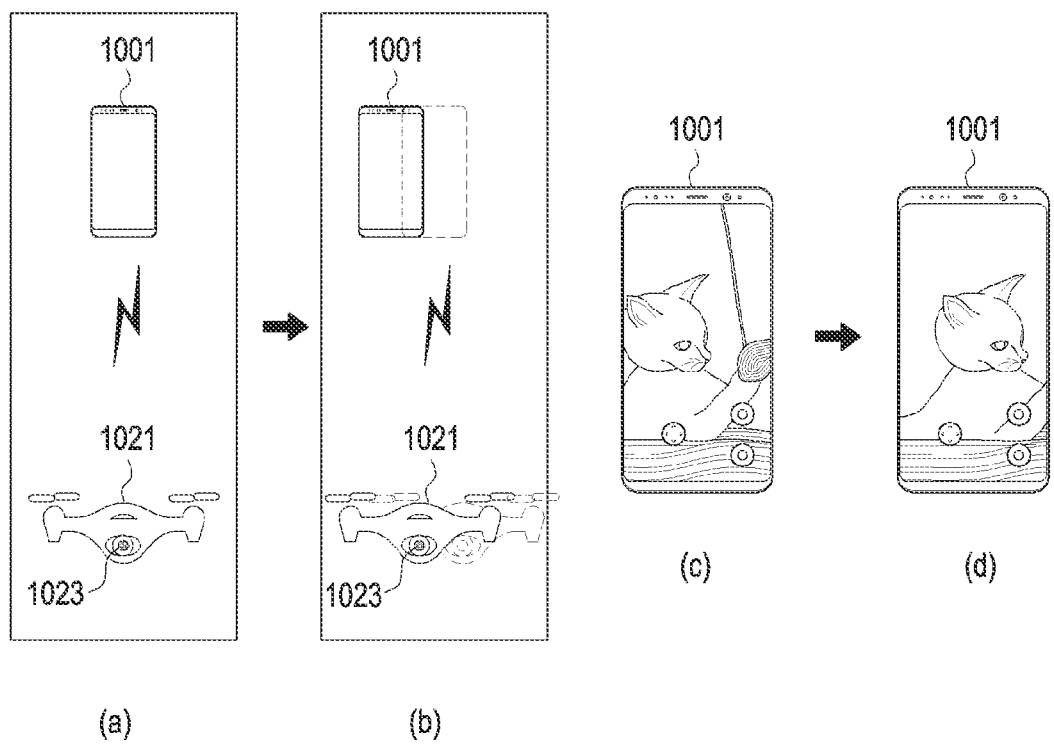

The electronic device 1001 may control the external electronic device 1021, based on travel of the electronic device 1001, as shown in FIG. 10C. The external electronic device 1021 may receive a control signal, based on travel of the electronic device 1001, and may physically move based on the control signal.

For example, as shown in view (a) in FIG. 10C, the electronic device 1001 remotely connected to the external electronic device 1021 may receive first image data obtained through the camera 1023 of the external electronic device 1021, from the external electronic device 1021. The electronic device 1001 having received the first image data may display a first image corresponding to the first image data in a designated reference direction, based on the posture (or orientation) of the electronic device 1001 at a time of reception of the first image data, as shown in view (c) of FIG. 10C.

For example, as shown in view (b) in FIG. 10C, when the electronic device 1001 remotely connected to the external electronic device 1021 is moved to a first location, the electronic device 1001 may identify at least one piece of information among a traveling distance (e.g., the traveling distance=1 cm) caused by the travel of the electronic device 1001 or a traveling direction (e.g., the traveling direction=right direction) of the electronic device 1001, and may transmit a signal for controlling the external electronic device 1021 to the external electronic device 1021, based on the identified information. The signal for controlling the external electronic device 1021 may include at least one of the traveling distance of the electronic device 1001 or the traveling direction of the electronic device 1001. The signal for controlling the external electronic device 1021 may include a command to control the external electronic device 1021, corresponding to at least one of the traveling distance of the electronic device 1001 or the traveling direction of the electronic device 1001.

For example, controlling the external electronic device 1021 may include controlling a physical movement of the external electronic device 1021, and the external electronic device 1021 having received the signal may control a physical movement of the external electronic device 1021, based on the signal. For example, as shown in view (b) in FIG. 10C, the external electronic device 1021 may move the external electronic device 1021 in a traveling direction corresponding to the traveling direction of the electronic device 1001 by a traveling distance corresponding to the traveling distance of the electronic device 1001.

The traveling external electronic device 1021 may obtain second image data by using the camera 1023, and may transmit the obtained second image data to the electronic device 1001. The electronic device 1001 having received the second image data may display a second image corresponding to the second image data in a designated reference direction, as shown in view (d) in FIG. 10C.

Figure 10D:
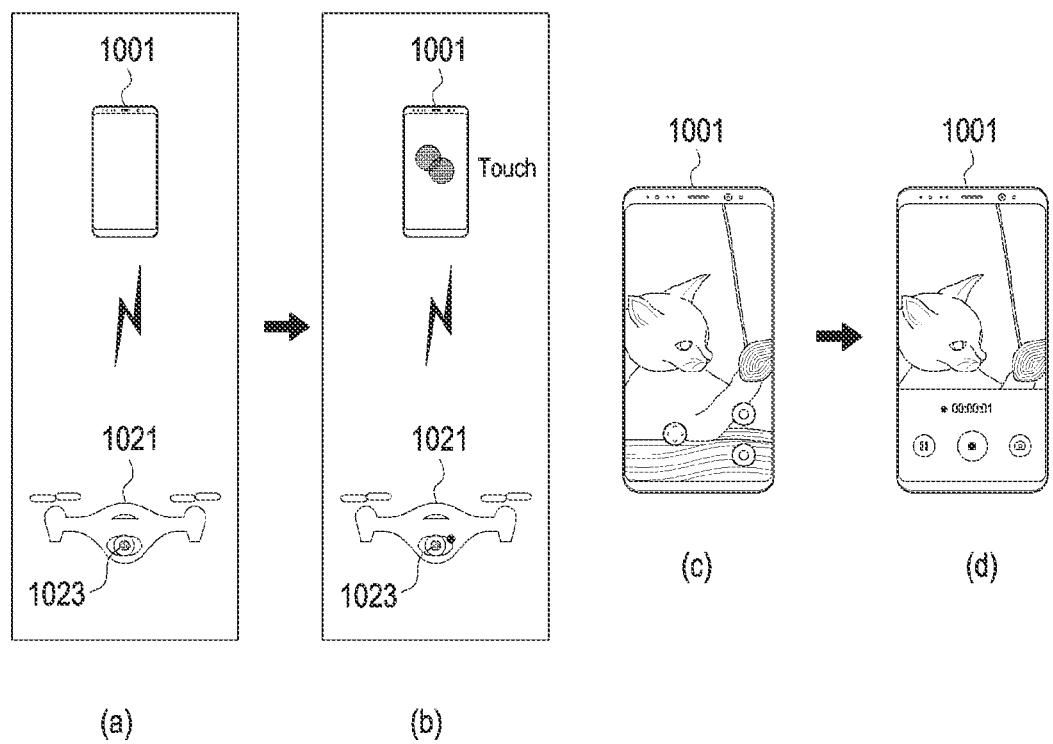

The electronic device 1001 may control the external electronic device 1021, based on a user input (e.g., a touch input and/or a voice input), as shown in FIG. 10D.

For example, as shown in view (a) in FIG. 10D, the electronic device 1001 remotely connected to the external electronic device 1021 may receive first image data obtained through the camera 1023 of the external electronic device 1021, from the external electronic device 1021. The electronic device 1001 having received the first image data may display a first image corresponding to the first image data in a designated reference direction, as shown in view (c) in FIG. 10D.

While the electronic device 1001 is displaying the first image as shown in view (c) in FIG. 10D, the electronic device may receive a touch input, as shown in view (b) in FIG. 10D, and the electronic device 1001 may transmit a signal for controlling the external electronic device 1023, to the external electronic device 1023, based on the touch input.

The external electronic device 1021 having received the signal may execute a designated function corresponding to the signal. For example, if the signal is for enabling execution of a recording function of the camera 1023 of the external electronic device 1021, the external electronic device 1021 may execute image recording by using the camera 1023, as shown in view (b) in FIG. 10D.

The external electronic device 1021 executing the image recording may transmit image data obtained through the image recording to the electronic device 1001. The electronic device 1001 having received the image data obtained through the image recording of the external electronic device 1021 may display an image corresponding to the image data obtained through the image recording, which includes a visual effect corresponding to image recording, in a designated reference direction, as shown in view (d) in FIG. 10D.

Further to FIG. 10B, the electronic device 1001 may transmit a control signal corresponding to the rotation angle of the electronic device 1001 to the external electronic device 1021, so as to execute a second function of the external electronic device 1021. The second function may include changing the rotation angle of the external electronic device 1021 to correspond to the rotation angle of the electronic device 1001. For example, if the electronic device 1001 is rotated by 315 degrees, the electronic device 1001 may transmit a signal for controlling the external electronic device 1021 to be rotated by 135 degrees, to the external electronic device 1021 so that the external electronic device 1021 may execute a rotation operation.

In FIGS. 10A to 10D, rotation, location movement, or a touch input of the electronic device 1001 are individually executed. Alternatively, at least two operations among rotation, location movement, or a touch input of the electronic device 1001 may be simultaneously executed, so that the operations in the embodiments, for controlling the electronic device 1001 and/or the external electronic device 1021 may be executed simultaneously according to the at least two operations.

In FIGS. 10A to 10D, the electronic device 1001 and the external electronic device 1021 are operated while communicating with each other. Alternatively, the electronic device 1001 and the external electronic device 1021 may be operated while communicating with each other through a server (e.g., the server 108 and/or the server 241). The external electronic device 1021 may transmit image data obtained through capturing by the external electronic device 1021 to the electronic device 1001 through the server. The electronic device 1001 may transmit a signal for controlling the external electronic device 1021 to the external electronic device 1021 through the server.

Figure 11:
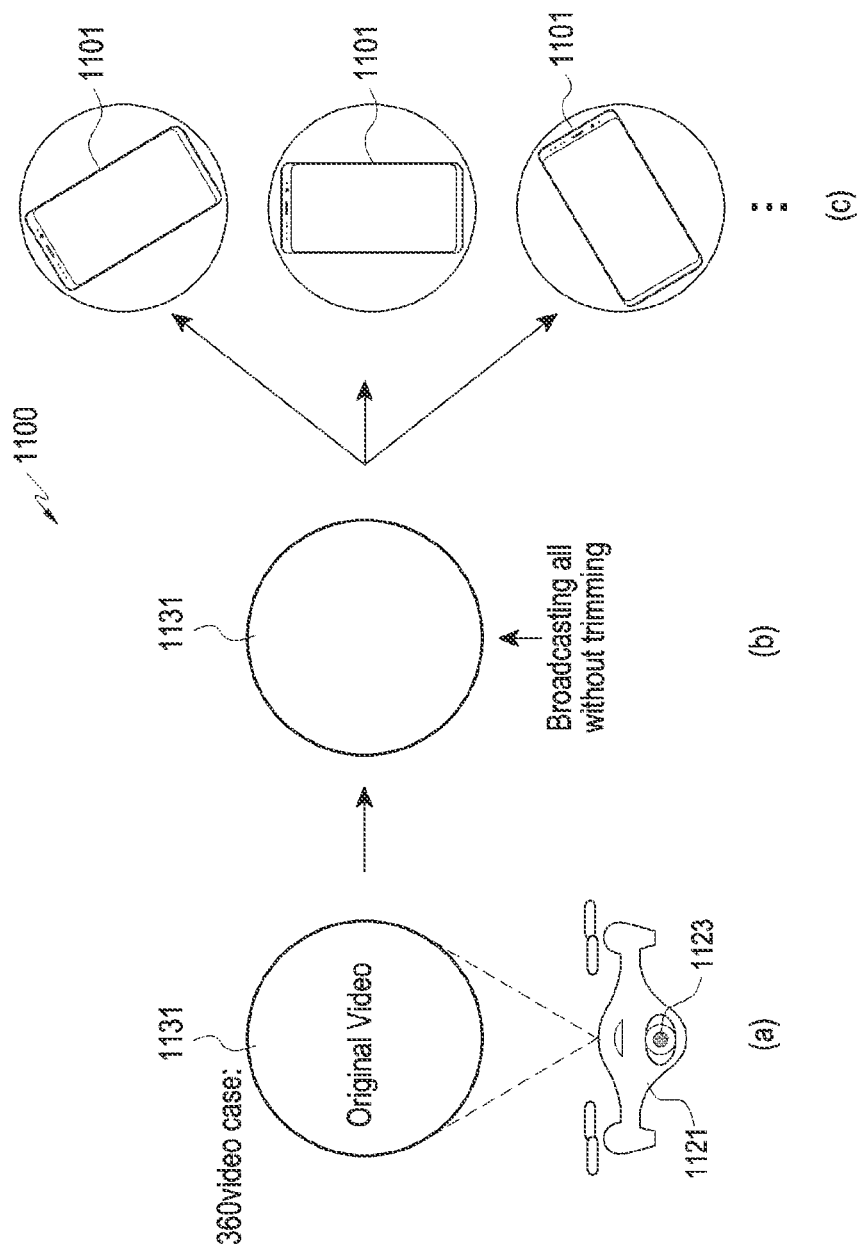
FIG. 11 illustrates an operation for processing, by an external electronic device, image data obtained using a camera.

FIG. 11 is a diagram 1100 illustrating an operation for processing, by an external electronic device 1121 (e.g., the electronic device 102, the electronic device 104, and/or the electronic device 221), image data 1131 obtained using a camera 1123 (e.g., the camera module 180 and/or the camera module 225, according to an embodiment.

The camera 1123 may include a 360-degree camera capable of obtaining 360-degree image data. The 360-degree camera may include multiple cameras for capturing a 360-degree multi-view image (an omnidirectional image).

Referring to stage (a) in FIG. 11, the external electronic device 1121 may obtain image data 1131 by using the camera 1123. The image data 1131 may be 360-degree image data.

Referring to stage (h) in FIG. 11, the external electronic device 1121 may transmit the image data 1131 to the electronic device 1101 without performing an operation of the external electronic device 921, for dividing image data into two areas and transmitting image data corresponding to a second area, as illustrated in FIG. 9.

Figure 12:
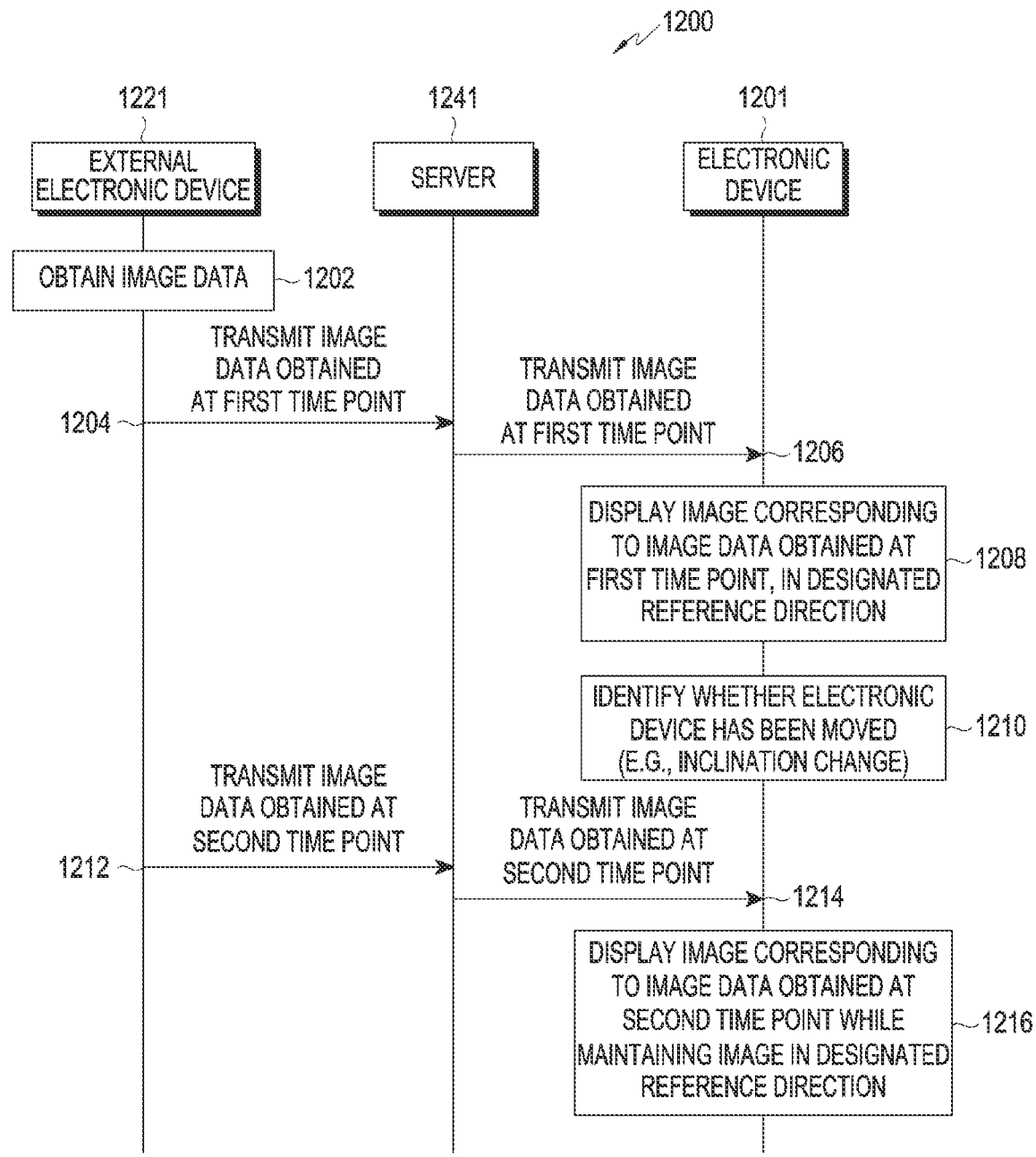
FIG. 12 illustrates an operation for controlling, by an electronic device, an external electronic device according to an embodiment.

Referring to stage (c) in FIG. 11, the electronic device 1101 having received the image data 1131 may display an image corresponding to image data received by the electronic device 1101 such that the image is always fixed in a constant direction regardless of a change in the inclination of the electronic device 1101, as in FIG. 10B. For example, in order to display an image corresponding to the received image data 1131, the electronic device 1101 may display the image to be maintained in a designated reference direction, not rotate and display to correspond to the rotation angle of the electronic device 1101, FIG. 12 is a flowchart 1200 illustrating an operation for controlling, by an electronic device 1201 (e.g., the electronic device 101, the processor 120 of the electronic device 101, the electronic device 201, and/or the processor 203 of the electronic device 2011, an external electronic device 1221 (e.g., the electronic device 102, the electronic device 104, and/or the electronic device 221) according to an embodiment.

In an operation 1202, the external electronic device 1221 may obtain image data.

The external electronic device 1221 may obtain image data in real time by using a camera of the external electronic device 1221. The image data obtained in real time may be transmitted to the electronic device 1201 through a server 1241 through a streaming scheme.

In an operation 1204, the external electronic device 1221 may transmit, to the server 1241, image data which is obtained at a first time point by using the camera of the external electronic device 1221.

The external electronic device 1221 may transmit the image data obtained at the first time point to the server 1241 by using a wireless communication circuit (e.g., the wireless communication circuit 227).

In an operation 1206, the server 1241 may transmit, to the electronic device 1201, the image data which is obtained at the first time point and is received from the external electronic device 1221.

The server 1241 may store, in a memory of the server 1241, the image data which is obtained at the first time point and is received from the external electronic device 1221, and may transmit the image data to the electronic device 1201 by using a wireless communication circuit.

In an operation 1208, the electronic device 1201 may display an image corresponding to the image data obtained at the first time point, in a designated reference direction.

The electronic device 1201 may receive the image data obtained at the first time point, from the server 1241, and may display an image corresponding to the image data obtained at the first time point, in a designated reference direction on a touchscreen display (e.g., the touchscreen display 209) of the electronic device 1201.

The designated reference direction may be a predesignated direction allowing an image corresponding to the received image data to always be fixed and displayed in a constant direction, regardless of a change in the rotation angle (inclination) of the electronic device 1201.

The electronic device 201 may display, in the designated reference direction, an image corresponding to the image data obtained at the first time point, based on at least one of the current location or the posture (or orientation) of the electronic device at a time of reception of the image data obtained at the first time point.

In an operation 1210, the electronic device 1201 may identify whether the electronic device 1201 has been moved (e.g., inclination change).

The electronic device 1201 may determine whether the electronic device 1201 itself has been moved, by using one or more sensors (e.g., the sensor module 207). For example, when the electronic device 1201 has been moved, the electronic device 1201 may obtain and store data (information) related to the movement. The movement of the electronic device 1201 may include rotation (inclination change), and the data related to the movement may include a rotation angle (inclination) of the electronic device 1201.

In an operation 1212, the external electronic device 1221 may transmit, to the server 1241, image data which is obtained at a second time point by using the camera of the external electronic device 1221.

The external electronic device 1221 may transmit the image data obtained at the second time point to the server 1241 by using the wireless communication circuit.

In an operation 1214, the server 1241 may transmit, to the electronic device 1201, the image data which is obtained at the second time point and is received from the external electronic device 1221.

The server 1241 may store, in a memory of the server 1241, the image data obtained at the second time point, and may transmit the image data to the electronic device 1201 by using the wireless communication circuit.

In an operation 1216, the electronic device 1201 may display, on a touchscreen display (e.g., the touchscreen display 209) of the electronic device 1201, an image corresponding to the image data obtained at the second time point while maintaining the image in the designated reference direction.

If it is identified in the operation 1210 by the electronic device 1201 that the electronic device 1201 itself has been moved, the electronic device 1201 may display the image corresponding to the image data obtained at the second time point, in the designated reference direction, based on the movement-related data (e.g., rotation angle) obtained according to the operation 1210. The electronic device 1201 may allow the image corresponding to the image data obtained at the second time point, to be rotated and displayed so as to correspond to the rotation angle of the electronic device 1201.

In FIG. 12, the electronic device 1201 transmits a control signal corresponding to a movement of the electronic device 1201 to the server 1241, and the server 1241 transmits the control signal to the external electronic device 1221, whereby a second function of the external electronic device 1221 may be executed. The second function may include changing a movement of the external electronic device 1221 to correspond to a movement of the electronic device 1201. For example, if the electronic device 1201 is rotated by 45 degrees, the electronic device 1201 may transmit a signal for controlling the external electronic device 1221 to be rotated by 45 degrees, to the external electronic device 1221 through the server 1241.

In FIG. 12, the external electronic device 1221 transmits image data to the electronic device 1201 through the server 1241. Alternatively, the external electronic device 1221 may directly transmit image data to the electronic device 1201 without transmitting through the server 1241.

Figure 13:
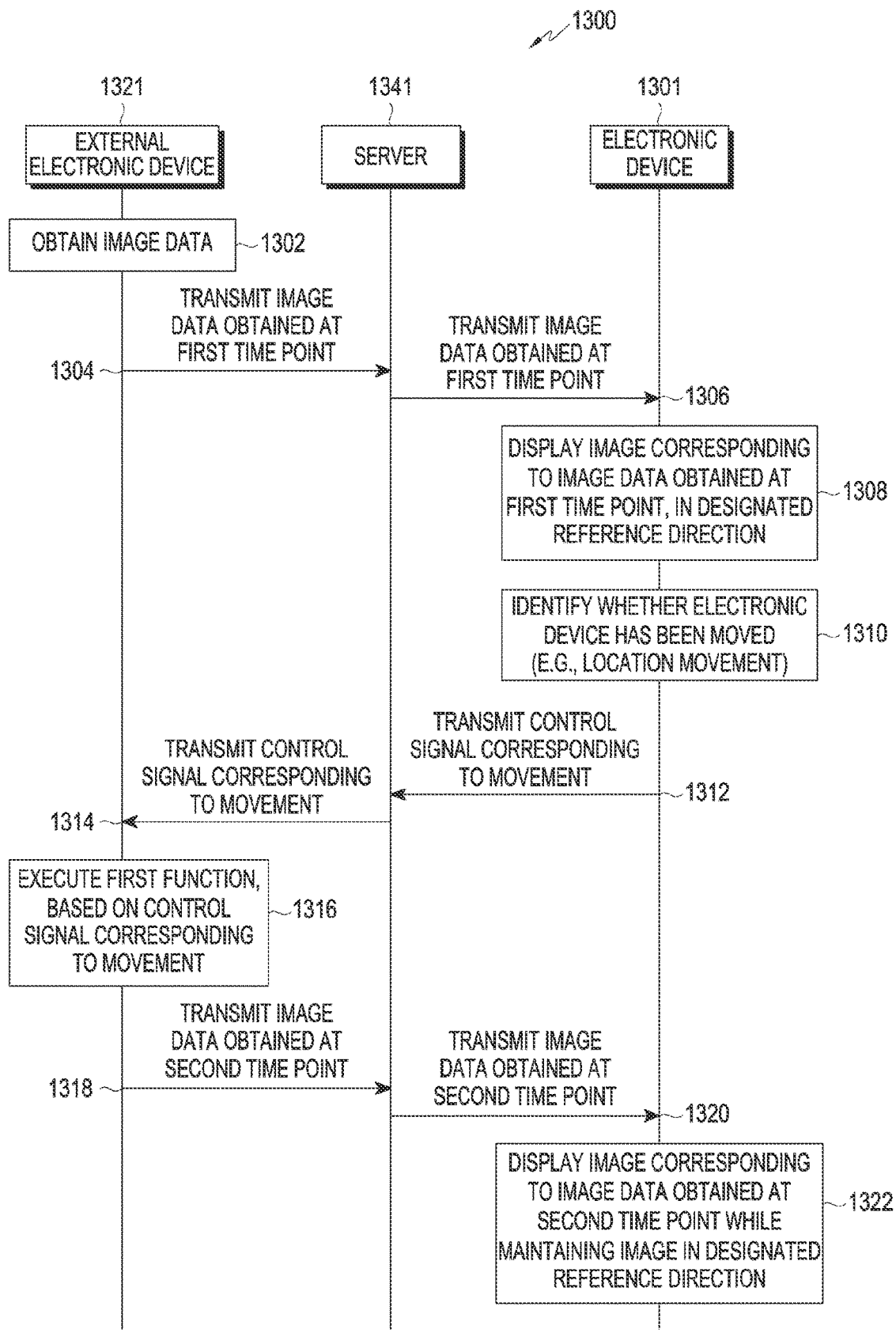
FIG. 13 illustrates an operation for controlling, by an electronic device, an external electronic device according to an embodiment.

FIG. 13 is a flowchart 1300 illustrating an operation for controlling, by an electronic device 1301 (e.g., the electronic device 101, the processor 120 of the electronic device 101, the electronic device 201, and/or the processor 203 of the electronic device 201), an external electronic device 1321 (e.g., the electronic device 102, the electronic device 104, and/or the electronic device 221) according to an embodiment.

In an operation 1302, the external electronic device 1321 may obtain image data.

The external electronic device 1321 may obtain image data in real time by using a camera (e.g., the camera module 225) of the external electronic device 1321. The image data obtained in real time may be transmitted to the electronic device 1301 through a server 1341 through a streaming scheme.

In an operation 1304, the external electronic device 1321 may transmit, to the server 1341, image data which is obtained at a first time point by using the camera of the external electronic device 1321.

The external electronic device 1321 may transmit the image data obtained at the first time point to the server 1341 by using a wireless communication circuit (e.g., the wireless communication circuit 227).

In an operation 1306, the server 1341 may transmit, to the electronic device 1301, the image data which is obtained at the first time point and is received from the external electronic device 1321.

The server 1341 may store, in a memory of the server 1341, the image data which is obtained at the first time point and is received from the external electronic device 1321, and may transmit the image data to the electronic device 1301 by using a wireless communication circuit.

In an operation 1308, the electronic device 1301 may display an image corresponding to the image data obtained at the first time point, in a designated reference direction.

The electronic device 1301 may receive the image data obtained at the first time point, from the server 1341, and may display an image corresponding to the image data obtained at the first time point, in a designated reference direction on a touchscreen display (e.g., the touchscreen display 209) of the electronic device 1301.

The designated reference direction may be a predesignated direction allowing an image corresponding to the received image data to always be fixed and displayed in a constant direction.

The electronic device 1301 may display, in the designated reference direction, an image corresponding to the image data obtained at the first time point, based on at least one of the current location or the posture (or orientation) of the electronic device 1301 at a time of reception of the image data obtained at the first time point.

In an operation 1310, the electronic device 1301 may identify whether the electronic device 1301 has been moved (e.g., location of movement).

The electronic device 1301 may identify whether the electronic device 1301 itself has been moved, by using one or more sensors (e.g., the sensor module 207). For example, a movement of the electronic device 1301 may include a location of the movement.

If it is determined that the electronic device 1301 has been moved, in operation 1310, the electronic device 1301 may perform operation 1312, and if it is determined that the electronic device 1301 has not been moved, in operation 1310, the electronic device 1301 may perform operation 1322 according to operation 1381 of the external electronic device 1321 and operation 1320 of the server 1341.

For example, when the electronic device 1301 has been moved, the electronic device 1301 may obtain and store data (information) related to the movement. The data related to the movement may include at least one of the traveling distance of the electronic device 1301 or the traveling direction of the electronic device 1301.

In the operation 1312, the electronic device 1301 may transmit, to the server 1341, a control signal for controlling the external electronic device 1321, which corresponds to the movement of the electronic device 1301.

If it is determined that the electronic device has been moved in the operation 1310, the electronic device 1301 may transmit, to the server 1341, a control signal for controlling the external electronic device 1321, which corresponds to the movement of the electronic device 1301 by using a wireless communication circuit (e.g., the wireless communication circuit 205). The control signal may include at least one of the data related to the movement or a command, which is based on the data related to the movement and the purpose of which is to control the external electronic device 1321.

In an operation 1314, the server 1341 may transmit, to the external electronic device 1321, a control signal for controlling the external electronic device 1321, which is received from the electronic device 1301 and corresponds to the movement of the electronic device 1301.

The server 1341 may transmit, by using the wireless communication circuit and to the external electronic device 1321, a control signal for controlling the external electronic device 1321, which corresponds to the movement of the electronic device 1301.

In an operation 1316, the external electronic device 1321 may execute a first function of the external electronic device 1321, based on the control signal for controlling the external electronic device 1321, which corresponds to the movement of the electronic device 1301.

The first function may include changing the location of the external electronic device 1321.

The control signal may include at least one of the traveling distance of the electronic device 1301 or the traveling direction of the electronic device 1301. Based on the information, the external electronic device 1321 may move the location of the external electronic device 1321 to correspond to the location movement of the electronic device 1301. In another example, the control signal may include at least one piece of information among a traveling distance of the external electronic device 1321 or a traveling direction of the external electronic device 1321, which is determined by the electronic device 1301, based on at least one piece of information among the traveling distance of the electronic device 1301 or the traveling direction of the electronic device 1301. Based on the information, the external electronic device 1321 may move the location of the external electronic device 1321 to correspond to the location movement of the electronic device 1301.

In the operation 1318, the external electronic device 1321 may transmit, to the server 1341, image data which is obtained at a second time point by using the camera of the external electronic device 1321.

The external electronic device 1321 may transmit the image data obtained at the second time point to the server 1341 by using the wireless communication circuit.

In the operation 1320, the server 1341 may transmit, to the electronic device 1301, the image data which is obtained at the second time point and is received from the external electronic device 1321.

The server 1341 may store, in a memory of the server 1341, the image data obtained at the second time point, and may transmit the image data to the electronic device 1301 by using the wireless communication circuit.

In an operation 1322, the electronic device 1301 may display, on a touchscreen display (e.g., the touchscreen display 209) of the electronic device 1201, an image corresponding to the image data obtained at the second time point while maintaining the image in the designated reference direction.

In FIG. 13, the external electronic device 1321 transmits image data to the electronic device 1301 through the server 1341. Alternatively, the external electronic device 1321 may directly transmit image data to the electronic device 1301 not through the server 1341.

In FIG. 13, the electronic device 1301 transmits a control signal to the external electronic device 1321 through the server 1341. Alternatively, the electronic device 1301 may directly transmit the control signal to the external electronic device 1321, not through the server 1341.

Figure 14:
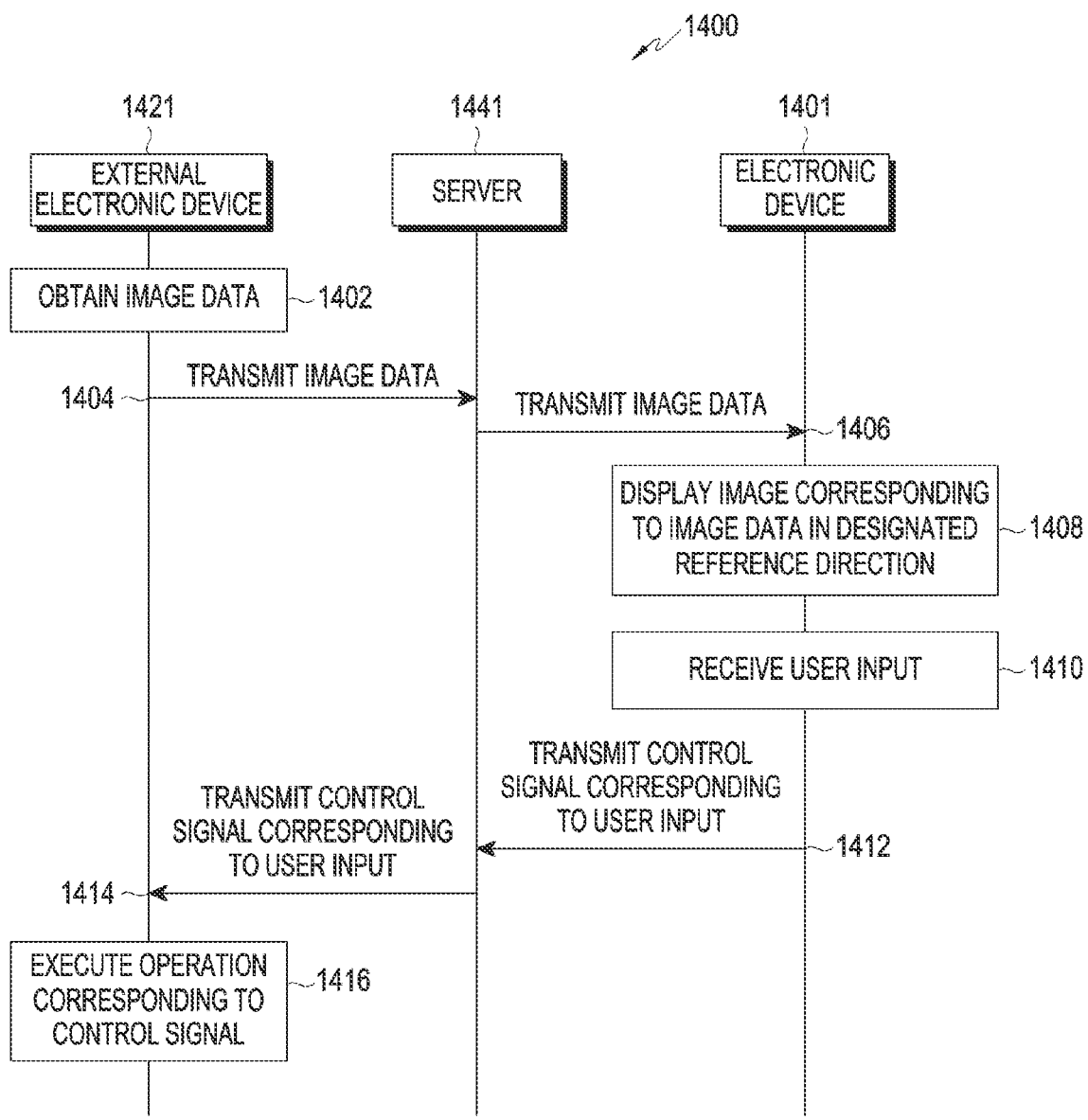
FIG. 14 illustrates an operation for controlling, by an electronic device, an external electronic device according to an embodiment.

FIG. 14 is a flowchart 1400 illustrating an operation for controlling, by an electronic device 1401 (e.g., the electronic device 101, the processor 120 of the electronic device 101, the electronic device 201, and/or the processor 203 of the electronic device 201), an external electronic device 1421 (e.g., the electronic device 102, the electronic device 104, and/or the electronic device 221) according to an embodiment.

In an operation 1402, the external electronic device 1421 may obtain image data.

The external electronic device 1421 may obtain image data in real time by using a camera (e.g., the camera module 225) of the external electronic device 1421. The image data obtained in real time may be transmitted to the electronic device 1401 through a server 1441 through a streaming scheme.

In an operation 1404, the external electronic device 1421 may transmit the image data to the server 1441.

The external electronic device 1421 may transmit the image data to the server 1441 by using a wireless communication circuit (e.g., the wireless communication circuit 227).

In an operation 1406, the server 1441 may transmit, to the electronic device 1401, the image data received from the external electronic device 1421.

The server 1441 may store the image data in a memory of the server 1441, and may transmit the image data to the electronic device 1401 by using a wireless communication circuit.

In an operation 1408, the electronic device 1401 may display an image corresponding to the image data in a designated reference direction.

The electronic device 1401 may receive the image data from the server 1441, and may display an image corresponding to the image data in a designated reference direction on a touchscreen display (e.g., the touchscreen display 209) of the electronic device 1401.

The designated reference direction may be a predesignated direction allowing an image corresponding to the received image data to always be fixed and displayed in a constant direction.

The electronic device 1401 may display, in the designated reference direction, the image corresponding to the image data, based on at least one of the current location or the posture (or orientation) of the electronic device 1401 at a time of reception of the image data.

In an operation 1410, the electronic device 1401 may receive a user input.

The user input may include a touch input on the touchscreen display of the electronic device 1401, or a voice input through a microphone of the electronic device 1401.

In an operation 1412, the electronic device 1401 may transmit, to the server 1441, a control signal for controlling the external electronic device 1421, which corresponds to the user input of the electronic device 1401.

The electronic device 1401 may transmit, to the server 1441, a control signal for controlling the external electronic device 1421, which corresponds to the user input of the electronic device 1401 by using a wireless communication circuit (e.g., the wireless communication circuit 205).

In an operation 1414, the server 1441 may transmit, to the external electronic device 1421, a control signal for controlling the external electronic device 1421, which is received from the electronic device 1401.

The server 1441 may transmit a control signal for controlling the external electronic device 1421 to the external electronic device 1421 by using the wireless communication circuit.

In an operation 1416, the external electronic device 1421 may execute an operation corresponding to the control signal for controlling the external electronic device 1421.

The operation corresponding to the control signal may be variously designated such as image recording using the camera of the external electronic device 1421, or outputting of a voice signal corresponding to voice data included in the control signal through a speaker of the external electronic device 1421.

FIG. 14, the external electronic device 1421 transmits image data to the electronic device 1401 through the server 1441. Alternatively, the external electronic device 1421 may directly transmit image data to the electronic device 1301 not through the server 1441.

In FIG. 14, the electronic device 1401 transmits a control signal to the external electronic device 1421 through the server 1441. Alternatively, the electronic device 1401 may directly transmit the control signal to the external electronic device 1421 not through the server 1441.

FIGS. 15A, 15B, 15C, 15D, and 15E illustrate an operation for controlling, by an electronic device 1501 (e.g., the electronic device 101, the processor 120 of the electronic device 101, the electronic device 201, and/or the processor 203 of the electronic device 201), an external electronic device 1521 (e.g., the electronic device 102, the electronic device 104, and/or the electronic device 221) according to an embodiment.

Figure 15A:
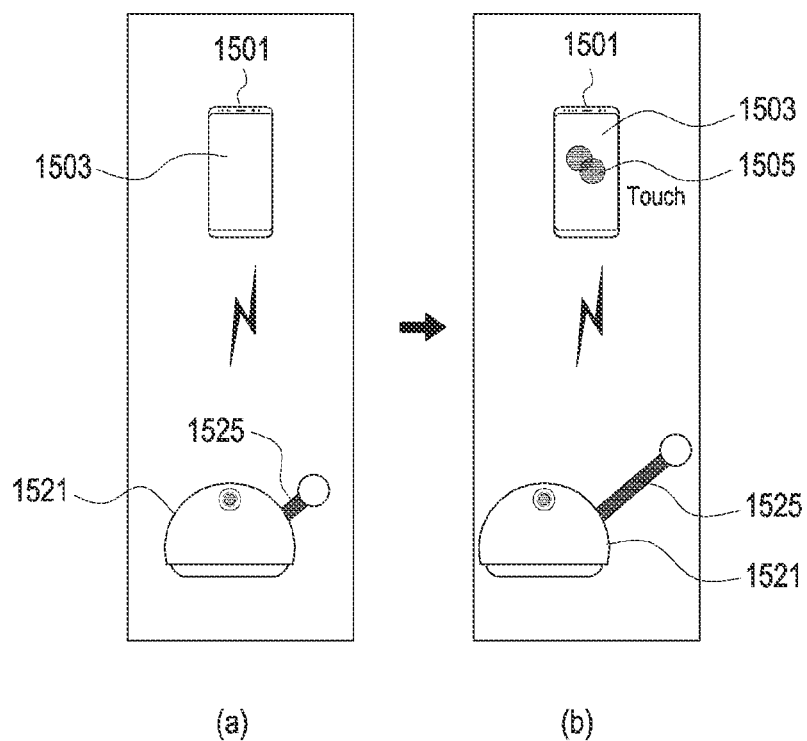
FIGS. 15A, 15B, 15C, 15D, and 15E illustrate an operation for controlling, by an electronic device, an external electronic device according to an embodiment.
Figure 15B:
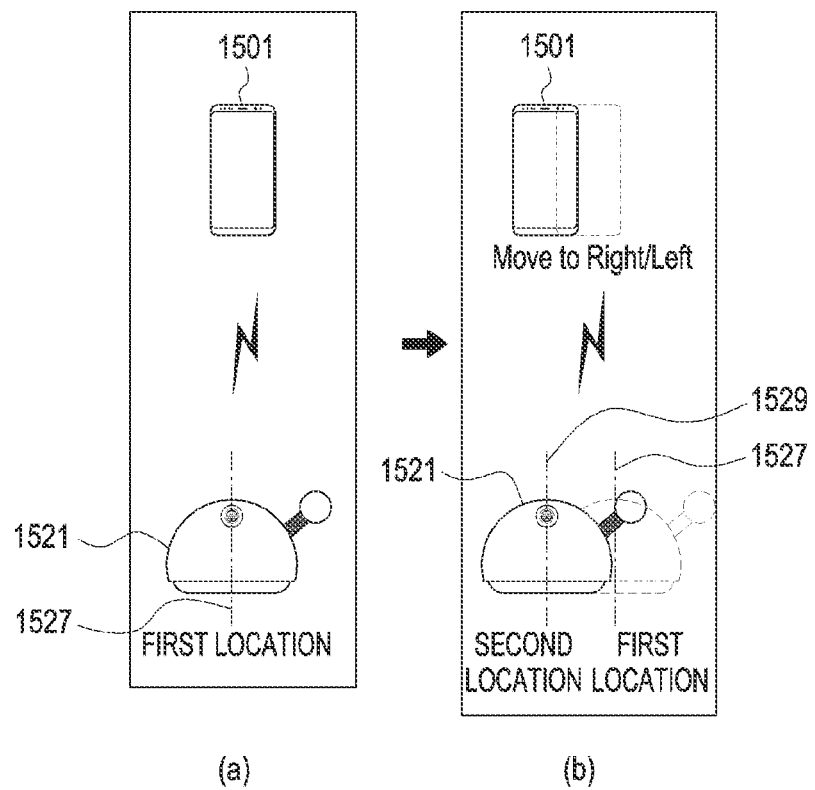
Figure 15C:
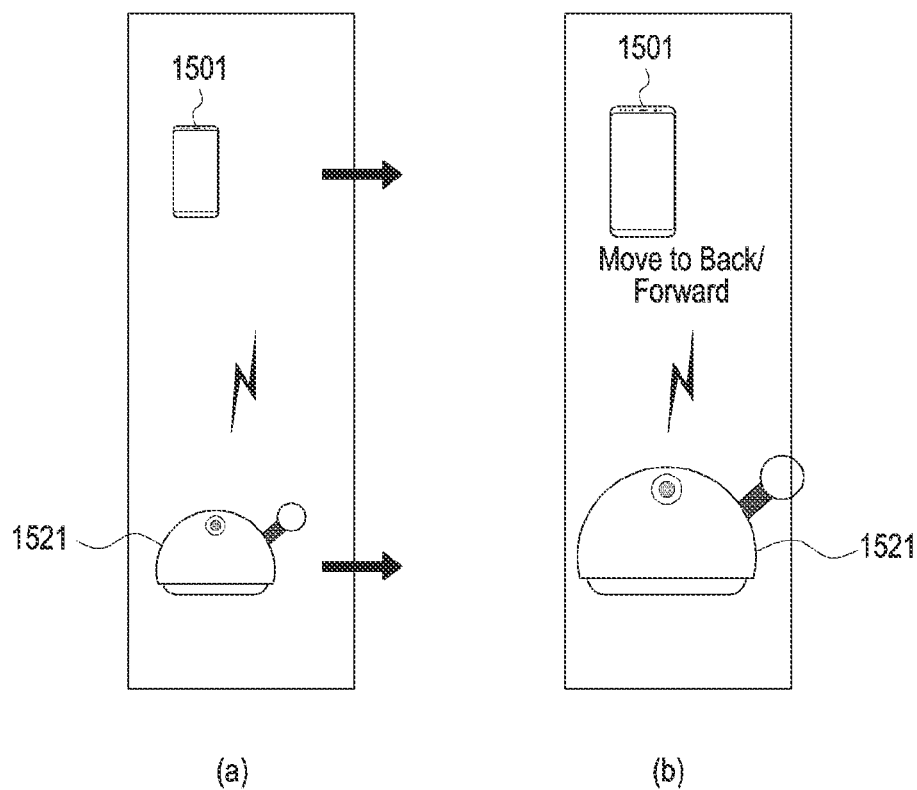
Figure 15D:
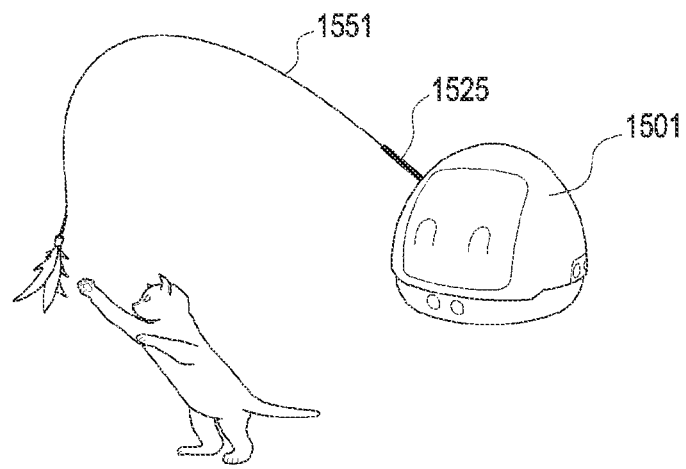
Figure 15E:

The external electronic device 1521 may be a robot for a pet. Referring to FIGS. 15A, 15B, and 15C, the electronic device 1501 communicating with the external electronic device 1521 may transmit a control signal to the external electronic device 1521 so that the external electronic device 1521 provides games to a pet as illustrated in FIG. 15D or FIG. 15E. According to the operations of FIGS. 15A, 15B, and 15C, when the electronic device 1501 provides games to a pet by remotely controlling the external electronic device 1521, the external electronic device 1521 can be quickly, simply, and conveniently controlled. For example, according to the operations of FIGS. 15A, 15B, and 15C, when a user quickly shakes the electronic device 1501 so as to quickly move the external electronic device 1521 or at least one element of the external electronic device, a conventional problem ensues in that it is difficult to recognize a displayed image due to its shaking.

Referring to view (a) and view (b) of FIG. 15A, the electronic device 1501 may communicate with the external electronic device 1521.

As illustrated in view (b) in FIG. 15A, if a touch input 1505 is received on a touchscreen display 1503 (e.g., the touchscreen display 209) of the electronic device 1501, the electronic device 1501 may transmit a control signal to the external electronic device. The external electronic device 1521 having received the control signal may control a first element 1525 of the external electronic device 1521. The external electronic device 1521 may control the first element 1525, based on the control signal, so that the first element becomes a state illustrated in view (b) of FIG. 15A from a state illustrated in view (a) of FIG. 15A. The external electronic device 1521 may control the length of the first element 1525 to be extended (or reduced) and/or control the first element 1525 to move, as a state illustrated in view (b) of FIG. 15A.

Referring to view (a) and view (h) of FIG. 15B, the electronic device 1501 may communicate with the external electronic device 1521.

As illustrated in view (b) in FIG. 15B, if it is identified that the electronic device 1501 has been moved (movement to the left or movement to the right), the electronic device 1501 may transmit a control signal to the external electronic device 1521. The electronic device 1501 may transmit, to the external electronic device 1521, a control signal allowing movement of the external electronic device 1521, so as to correspond to travel (at least one of a traveling direction or a traveling distance) of the electronic device 1501, The external electronic device 1521 may move to the right (or move to the left) to correspond to a movement of the electronic device 1501 to the right (or a movement to the left). The external electronic device 1521 having received the control signal may physically move (to the left or to the right) the external electronic device 1521. The external electronic device 1521 may physically move the external electronic device 1521 from a first location 1527 illustrated in view (a) of FIG. 15B to a second location 1529 illustrated in view (b) in FIG. 15B, based on the control signal.

Referring to view (a) and view (b) of FIG. 15C, the electronic device 1501 may communicate with the external electronic device 1521.

As illustrated in view (b) in FIG. 15C, if it is identified that the electronic device 1501 has been moved (forward or backward movement), the electronic device 1501 may transmit a control signal to the external electronic device 1521. The electronic device 1501 may transmit, to the external electronic device 1521, a control signal allowing movement of the external electronic device 1521, so as to correspond to travel (at least one of a traveling direction or a traveling distance) of the electronic device 1501. The external electronic device 1521 may move to the front (or move to the back) to correspond to a movement of the electronic device 1501 to the front (or a movement to the back). The external electronic device 1521 having received the control signal may physically move (to the front or to the back) the external electronic device 1521. The external electronic device 1521 may physically move the external electronic device 1521 from a first location illustrated in view (a) of FIG. 15C to a second location illustrated in view (b) in FIG. 15C, based on the control signal.

The external electronic device 1521 may be a robot for a pet. For example, according to an operation of at least one of the embodiments described above with reference to FIGS. 15A, 15B, and 15C, the electronic device 1501 may control the external electronic device 1521 such that the external electronic device 1521 provides games to a pet as in FIG. 15D or FIG. 15E. Referring to FIG. 15D, when a first element 1525 of the external electronic device 1521 is connected to a cat fishing toy 1551, the external electronic device may provide games to a cat according to at least one of the embodiments described above with reference to FIGS. 15A, 15B, and 15C. Referring to FIG. 15E, when a ball 1551 is positioned in a first part of the first element 1525 of the external electronic device 1521, the external electronic device may provide a ball game to a dog, based on a control of the movement of the first element 1525, according to the embodiment described above with reference to FIG. 15A.

The external electronic device 1521 may be operated as a robot for pet care other than the described embodiment operations.

The external electronic device 1521 may be a robot for identifying a pet's activity and sensing a pet's abnormal and unexpected situations. The external electronic device 1521 may be used when a pet is emotionally unstable in an empty house without the pet's owner, or when the pet's owner has to be away from home for several days. The external electronic device 1521 may be used by a user to identify the state of the pet, communicate with the pet, and respond to an unexpected situation occurring to the pet. The external electronic device 1521 may be used by a one-person household who raises a pet, or a household, the members of which are away from their home during a daily routine.

The external electronic device 1521 may be an integrated platform combined with a camera (e.g., the camera module 225), one or more sensors (e.g., the sensor module 231), and/or various smart pet products (an automatic feeding machine, an automatic water feeder, and/or an automatic pet bathroom).

For example, functions of the external electronic device 1521 may include a function of feeding a pet at a designated time, a function of assisting pet walking, and/or a function of providing stability during the owner's absence.

The external electronic device 1521 may provide a function corresponding to a pet's behavior pattern or daily pattern. The function may include providing, by the external electronic device 1521, water and food to a designated fishbowl or a feeding place at a designated time. The function may include measuring the temperature and/or the heart rate of a pet to check a health condition of the pet, and when a danger to the health of the pet is sensed when the health condition of the pet is checked, executing a notification operation. For example, if a pet is a cat, the function may include the external electronic device 1521 checking a litterbox every designated time regardless of whether there is excrement from the cat, and if it is determined that the litterbox is required to be cleaned, cleaning the litterbox. The function may include capturing an image in real time similar to a closed circuit television (CCTV), and may additionally include providing an owner's recorded voice to a pet so that the owner can communicate with the pet. The function of providing an owner's recorded voice to a pet may include providing an owner's recorded voice corresponding to a particular behavior when a pet performs the behavior. The function may include rolling a pet's toy, or providing simple games such as using a laser pointer.

The external electronic device 1521 may observe and/or record a pet's behaviors to identify the pet's health and identify whether or not the pet is uncomfortable or is sick.

For example, when a sensor including information related to a pet is inserted in the pet's body according to a pet registration system, if the sensor includes a function of measuring location information, a function of measuring biometric information of the pet, and/or a communication function, the external electronic device 1521 may identify the location of the pet, and the health condition of the pet.

For example, if unexpected situations occur to a pet, the external electronic device 1521 may perform an operation corresponding to each of the unexpected situations. For example, if it is determined that a pet is sick, the external electronic device 1521 may urgently call a user through signal transmission to a registered electronic device and/or alarm sound generation, and may provide the pet's biometric signals and situation information to a system of an animal hospital. For example, if it is identified that a pet ran away from home, the external electronic device may urgently call a user through signal transmission to a registered electronic device and/or alarm sound generation through a speaker, identify the travel route and/or the location of the pet, and transmit a signal to the registered electronic device, and/or provide information through the speaker.

The external electronic device 1521 may provide a function of providing a predetermined stimulus to a pet and allowing the pet to feel affection. The external electronic device 1521 itself may execute autonomous behaviors through artificial intelligence (AI) so as to prevent a pet from feeling alone. The external electronic device 1521 may execute a television program preferred by the pet, may automatically connect to the electronic device 1501, and may call a name of, pet, cuddle, and/or play with the pet.

The external electronic device 1521 may identify the cleanliness of a pet and a feeding status. The external electronic device may monitor a state and a usage state of a food dish, a water dish, a litterbox, and a toy of a pet.

The external electronic device 1521 may identify whether a window and/or a door is open.

The external electronic device 1521 may collect ordinary data (image and/or voice) of a pet, and may perform a function of giving a warning when an anomaly of a pet is identified.

Figure 16:
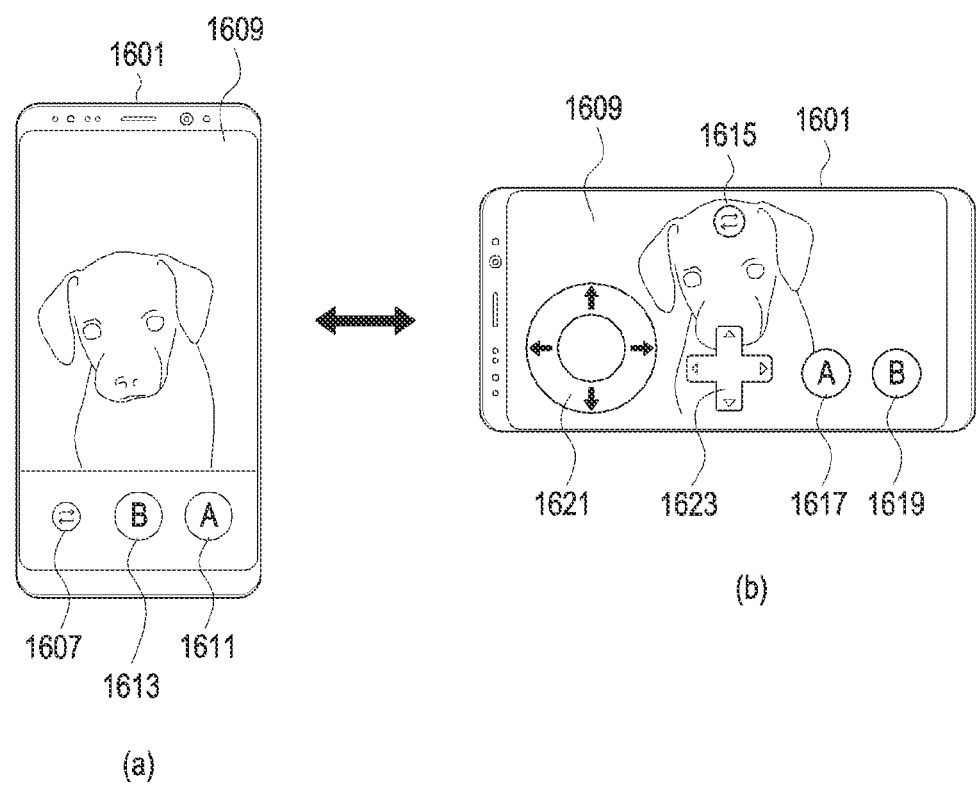
FIG. 16 illustrates an execution screen of an electronic device, for controlling an external electronic device according to an embodiment.

FIG. 16 illustrates an execution screen of an electronic device 1601 (e.g., the electronic device 101, the processor 120 of the electronic device 101, the electronic device 201, and/or the processor 203 of the electronic device 201) controlling an external electronic device (e.g., the electronic device 120, the electronic device 104, and/or the electronic device 221) according to an embodiment.

Referring to FIG. 16, the electronic device 1601 may display a screen for controlling an external electronic device on a touchscreen display 1609 (e.g., the touchscreen display 209).

The electronic device 1601 may display an execution screen for controlling an external electronic device on the touchscreen display 1609 when an application or a button for controlling the external electronic device is executed according to a user input. The electronic device 1601 may receive, from an external electronic device, image data obtained through a camera of the external electronic device, and may display an image corresponding to the image data on the execution screen. The execution screen may be shown in view (a) in FIG. 16, corresponding to a first mode, or shown in view (b) in FIG. 16, corresponding to a second mode. The first mode may be configured to control the external electronic device through a movement of the electronic device 1601 and a touch input on the touchscreen display 1609. The second mode may be configured to control the external electronic device through a touch input on the touchscreen display 1609.

The electronic device 1601 may display, on the touchscreen display 1609, an execution screen corresponding to the first mode as shown in view (a) in FIG. 16.

The execution screen corresponding to the first mode may include at least one of a first button 1607 (e.g., a switching button), a second button 1611 (e.g., a first function button), or a third button 1613 (e.g., a second function button). The first button 1607 may enable the electronic device 1601 to switch from the first mode to second mode. The second button "A" 1611 may enable transmission of a first signal by which the electronic device 1601 controls the external electronic device to execute a first function. The third button "B" 1613 may enable transmission of a second signal by which the electronic device 1601 controls the external electronic device to execute a second function. The execution screen corresponding to the first mode may include an image corresponding to image data received from the external electronic device.

For example, when the first mode is executed, the electronic device 1601 may allow the electronic device 1601 to operate in a vertical mode, as shown in view (a) in FIG. 16. In the vertical mode, if the touchscreen display 1609 of the electronic device 1601 is rectangular as shown in view (a) in FIG. 16, the touchscreen display 1609 is in a display state wherein a horizontal size is smaller than a vertical size while the electronic device is put in parallel on a horizontal plane.

The electronic device 1601 may display, on the touchscreen display 1609, an execution screen corresponding to the second mode as shown in view (b) in FIG. 16.

For example, the execution screen corresponding to the second mode may include at least one of a fifth button (e.g., a switching button 1615), a sixth button 1617 (e.g., a first function button), a seventh button 1619 (e.g., a second function button), an eighth button 1621 (e.g., a movement control button), or a ninth button 1623 (e.g., a rotation angle control button). The fifth button 1615 may enable the electronic device 1601 to switch from the second mode to the first mode. The sixth button "A" 1617 may correspond to the second button "A" 1611, and may enable transmission of a first signal by which the electronic device 1601 controls the external electronic device to execute a first function. The seventh button "B" 1619 may correspond to the third button "B" 1613, and may enable transmission of a second signal by Which the electronic device 1601 controls the external electronic device to execute a second function. The eighth button 1621 may enable the electronic device 1601 to transmit a signal for controlling a movement of the external electronic device. The signal for controlling a movement of the external electronic device may include at least one piece of information among a traveling distance or a traveling direction of the external electronic device. The signal for controlling a movement of the external electronic device may be a signal for controlling a movement of the external electronic device in an upward, downward, right, or left direction. The ninth button 1623 may enable the electronic device 1601 to transmit a signal for controlling a rotation angle of the external electronic device. The execution screen corresponding to the second mode may include an image corresponding to image data received from the external electronic device.

For example, when the second mode is executed, the electronic device 1601 may allow the electronic device 1601 to operate in a horizontal mode, as shown in view (b) in FIG. 16. In the horizontal mode, if the touchscreen display 1609 of the electronic device 1601 is rectangular as shown in view (b) in FIG. 16, the touchscreen display 1609 is in a display state wherein a horizontal size is larger than a vertical size while the electronic device is placed parallel to a horizontal plane.

According to an embodiment, a method for controlling an external electronic device by an electronic device (e.g., the electronic device 101, the processor 120 of the electronic device 101, the electronic device 201, and/or the processor 203 of the electronic device 201) may include receiving image data obtained using a camera (e.g., the camera module 225) of the external electronic device (e.g., the electronic device 102 and/or the electronic device 104), identifying data related to a movement of the electronic device, which is obtained through one or more sensors (e.g., the sensor module 176 and/or the sensor module 207) of the electronic device, and based on the data related to the movement of the electronic device, displaying an image corresponding to the received image data on a touchscreen display of the electronic device while maintaining the image in a designated reference direction.

The method may further include, based on the data related to the movement of the electronic device, transmitting a control signal for controlling the external electronic device to the external electronic device or a server (e.g., the server 108 and/or the server 241) configured to communicate with the external electronic device.

The method may further include, based on the data related to the movement of the electronic device, identifying at least one of a traveling distance of the electronic device or a traveling direction of the electronic device, wherein the transmitting of the control signal for controlling the external electronic device to the external electronic device or the server configured to communicate with the external electronic device includes, based on at least one of the traveling distance of the electronic device or the traveling direction of the electronic device, transmitting the control signal for controlling the external electronic device to the external electronic device or the server configured to communicate with the external electronic device.

The method may further include receiving additional image data obtained using the camera of the external electronic device, and the displaying of the image corresponding to the received image data on the touchscreen display of the electronic device while maintaining the image in the designated reference direction includes displaying an image corresponding to the received additional image data on the touchscreen display while maintaining the image in the designated reference direction.

The method may further include: based on the data related to the movement of the electronic device, identifying a rotation angle of the electronic device, and based on the rotation angle of the electronic device, displaying an image corresponding to the received image data on the touchscreen display in the designated reference direction.

The one or more sensors may include at least one of a gyro sensor, an acceleration sensor, or a compass device.

The method may further include, based on a touch input received through the touchscreen display, transmitting a control signal for controlling the external electronic device to the external electronic device or a server configured to communicate with the external electronic device.

The method may further include, based on the received touch input while the image is being displayed on the touchscreen display, transmitting, the control signal to the external electronic device or the server configured to communicate with the external electronic device.

The method may further include receiving the image data from the external electronic device or a server configured to communicate with the external electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order), It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Herein, in a recording medium in which commands are stored, the commands are configured to, when executed by at least one circuit, cause the at least one circuit to perform at least one operation, the at least one operation including receiving image data obtained using a camera of the external electronic device; identifying data related to a movement of the electronic device, which is obtained through one or more sensors of an electronic device, and based on the data related to the movement of the electronic device, displaying an image corresponding to the received image data on a touchscreen display of the electronic device while maintaining the image in a designated reference direction.

The at least one operation may further include, based on the data related to the movement of the electronic device, transmitting a control signal for controlling the external electronic device to the external electronic device or a server configured to communicate with the external electronic device.

While the present disclosure has been described with reference to various embodiments, various changes may be made without departing from the spirit and the scope of the present disclosure, which is defined, not by the detailed description and embodiments, but by the appended claims and their equivalents.

The invention claimed is:

1. An electronic device comprising:
   a communication circuit;
   one or more sensors;
   a touchscreen display;
   one or more processors operatively connected to the communication circuit, the one or more sensors, and the touchscreen display; and
   a memory operatively connected to the one or more processors,
   wherein the memory stores instructions which, when executed, cause the one or more processors to:
   receive, through the communication circuit, first image data obtained using a camera of an external electronic device;
   control the touchscreen display to display a first image corresponding to the received first image data while the first image is maintained in a designated reference direction;
   obtain data related to a rotation of the electronic device by a first angle in a first direction through the one or more sensors;
   transmit a control signal for moving the external electronic device based on the obtained data;
   receive, through the communication circuit, second image data obtained using the camera of the external electronic device which is moved according to the control signal; and
   control the touchscreen display to display a second image corresponding to the received second image data while the second image is maintained in the designated reference direction by rotating the second image by the first angle in a second direction opposite to the first direction.

2. The electronic device of claim 1, wherein the instructions further cause the one or more processors to:
   based on data related to a movement of the electronic device, identify at least one of a traveling distance of the electronic device or a traveling direction of the electronic device; and
   based on at least one of the traveling distance of the electronic device or the traveling direction of the electronic device, transmit a control signal for controlling the external electronic device, through the communication circuit, to the external electronic device or a server configured to communicate with the external electronic device.

3. The electronic device of claim 2, wherein the instructions further cause the one or more processors to:
   receive, through the communication circuit, additional image data obtained using the camera of the external electronic device; and
   perform control such that an image corresponding to the received additional image data is displayed on the touchscreen display while the image is maintained in the designated reference direction.

4. The electronic device of claim 1, wherein the one or more sensors comprises at least one of a gyro sensor, an acceleration sensor, or a compass device.

5. The electronic device of claim 1, wherein the instructions further cause the one or more processors to:
   based on a touch input received through the touchscreen display, transmit a control signal for controlling the external electronic device, through the communication circuit, to the external electronic device or a server configured to communicate with the external electronic device.

6. The electronic device of claim 1, wherein the instructions further cause the one or more processors to receive the first image data through the communication circuit from the external electronic device or a server configured to communicate with the external electronic device.

7. A method for controlling an external electronic device by an electronic device, the method comprising:
   receiving first image data obtained using a camera of the external electronic device;
   displaying an image corresponding to the received first image data on a touchscreen display of the electronic device while maintaining the first image in a designated reference direction;
   obtaining data related to a rotation of the electronic device by a first angle in a first direction through one or more sensors of the electronic device;
   transmitting a control signal for moving the external electronic device based on the obtained data;
   receiving, through the communication circuit, second image data obtained using the camera of the external electronic device which is moved according to the control signal; and
   controlling the touchscreen display to display a second image corresponding to the received second image data while the second image is maintained in the designated reference direction by rotating the second image by the first angle in a second direction opposite to the first direction.

8. The method of claim 7, further comprising, based on data related to a movement of the electronic device, identifying at least one of a traveling distance of the electronic device or a traveling direction of the electronic device; and
   transmitting a control signal for controlling the external electronic device to the external electronic device or a server configured to communicate with the external electronic device comprises, based on at least one of the traveling distance of the electronic device or the traveling direction of the electronic device, transmitting the control signal for controlling the external electronic device to the external electronic device or the server configured to communicate with the external electronic device.

9. The method of claim 8, further comprising receiving additional image data obtained using the camera of the external electronic device,
   wherein displaying the image corresponding to the received image data on the touchscreen display of the electronic device while maintaining the image in the designated reference direction comprises displaying an image corresponding to the received additional image data on the touchscreen display while maintaining the image in the designated reference direction.

10. The method of claim 7, wherein the one or more sensors comprises at least one of a gyro sensor, an acceleration sensor, or a compass device.

11. The method of claim 7, further comprising, based on a touch input received through the touchscreen display, transmitting a control signal for controlling the external electronic device to the external electronic device or a server configured to communicate with the external electronic device.

12. The method of claim 7, further comprising receiving the first image data from the external electronic device or a server configured to communicate with the external electronic device.

* * * * *